(12) United States Patent
Utoh

(10) Patent No.: US 8,713,341 B2
(45) Date of Patent: Apr. 29, 2014

(54) SELECTING FROM A PLURAL OF ENERGY SAVING MODES

(75) Inventor: Yohsuke Utoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 399 days.

(21) Appl. No.: 13/112,292

(22) Filed: May 20, 2011

(65) Prior Publication Data

US 2011/0317189 A1 Dec. 29, 2011

(30) Foreign Application Priority Data

Jun. 24, 2010 (JP) .................. 2010-143671
Apr. 12, 2011 (JP) .................. 2011-088381

(51) Int. Cl.
*G06F 1/00* (2006.01)

(52) U.S. Cl.
USPC .................. 713/324; 713/300; 713/320

(58) Field of Classification Search
USPC .................. 713/300, 320, 324
See application file for complete search history.

(56) References Cited

U.S. PATENT DOCUMENTS

2008/0109663 A1* 5/2008 Snyder et al. .............. 713/300
2010/0299547 A1* 11/2010 Saika ........................ 713/324

FOREIGN PATENT DOCUMENTS

| CN | 101059671 A | 10/2007 |
| JP | 11-95626 | 4/1999 |
| JP | 2005-215316 | 8/2005 |

OTHER PUBLICATIONS

Combined Chinese Office Action and Search Report issued Sep. 9, 2013, in Chinese Patent Application No. 2011101756436 with English translation.

* cited by examiner

*Primary Examiner* — Eric A Rust
(74) *Attorney, Agent, or Firm* — Oblon, Spivak, McClelland, Maier & Neustadt, L.L.P.

(57) ABSTRACT

An image processing apparatus includes an energy saving mode entering process part configured to associate each of plural functions and a minimum necessary energy saving mode of plural energy saving modes to perform the function as first information; and a counting process part configured to count a usage period of time for a used function of the plural functions for each unit period of time. The energy saving mode entering process part is configured to determine which of the plural energy saving modes to enter based on the counted usage periods of time for a present unit period of time and cause the image processing apparatus to enter the determined energy saving mode.

16 Claims, 17 Drawing Sheets

| FUNCTION | ENERGY SAVING MODE | TO WHICH POWER IS SUPPLIED | | | | | |
|---|---|---|---|---|---|---|---|
| | | IMAGE INPUT PART | IMAGE FORMING PART | OPERATION AND DISPLAY PART | HDD | FAX CONTROL PART | CONTROL PART |
| COPY | ENERGY SAVING MODE 1 | O | O | O | O | × | O |
| FAX TRANSMISSION | ENERGY SAVING MODE 2 | O | × | O | O | O | O |
| PRINTER PRINTING | ENERGY SAVING MODE 3 | × | O | △ (ONLY FOR LED) | O | × | O |
| FAX RECEPTION PRINTING | ENERGY SAVING MODE 4 | × | O | △ (ONLY FOR LED) | O | O | O |
| PRINTER STORAGE | ENERGY SAVING MODE 5 | × | × | △ (ONLY FOR LED) | O | × | O |
| FAX RECEPTION STORAGE | ENERGY SAVING MODE 6 | × | × | △ (ONLY FOR LED) | O | O | O |
| DATA ACCESS OTHER THAN HDD | ENERGY SAVING MODE 7 | × | × | × | × | × | O |
| NETWORK PROCESS | ENERGY SAVING MODE 8 | × | × | × | × | × | △ (ONLY FOR SYSTEM TO CHANGE MODE) |

FIG.3

| ↓ ENERGY SAVING MODE   TIME ZONE→ | 0:00 THROUGH 2:00 | 2:00 THROUGH 4:00 | ... | 22:00 THROUGH 24:00 |
|---|---|---|---|---|
| ENERGY SAVING MODE 1 | 10 MINUTES | 20 MINUTES | ... | 0 MINUTES |
| ENERGY SAVING MODE 2 | 5 MINUTES | 0 MINUTES | ... | 0 MINUTES |
| ENERGY SAVING MODE 3 | 0 MINUTES | 7 MINUTES | ... | 0 MINUTES |
| ... | | | | |

FIG.4

| ↓ ENERGY SAVING MODE   TIME ZONE→ | 0:00 THROUGH 2:00 | 2:00 THROUGH 4:00 | ... | 22:00 THROUGH 24:00 |
|---|---|---|---|---|
| ENERGY SAVING MODE 1 | 110 MINUTES | 20 MINUTES | ... | 2100 MINUTES |
| ENERGY SAVING MODE 2 | 20 MINUTES | 0 MINUTES | ... | 1500 MINUTES |
| ENERGY SAVING MODE 3 | 5 MINUTES | 7 MINUTES | ... | 30 MINUTES |
| ... | | | | |

FIG.5

| FUNCTION | ENERGY SAVING MODE | TO WHICH POWER IS SUPPLIED | | | | | |
|---|---|---|---|---|---|---|---|
| | | IMAGE INPUT PART | IMAGE FORMING PART | OPERATION AND DISPLAY PART | HDD | FAX CONTROL PART | CONTROL PART |
| COPY | ENERGY SAVING MODE 1 | ○ | ○ | ○ | ○ | × | ○ |
| FAX TRANSMISSION | ENERGY SAVING MODE 2 | ○ | × | ○ | ○ | ○ | ○ |
| PRINTER PRINTING | ENERGY SAVING MODE 3 | × | ○ | △ (ONLY FOR LED) | ○ | × | ○ |
| FAX RECEPTION PRINTING | ENERGY SAVING MODE 4 | × | ○ | △ (ONLY FOR LED) | ○ | ○ | ○ |
| PRINTER STORAGE | ENERGY SAVING MODE 5 | × | × | △ (ONLY FOR LED) | ○ | × | ○ |
| FAX RECEPTION STORAGE | ENERGY SAVING MODE 6 | × | × | △ (ONLY FOR LED) | ○ | ○ | ○ |
| DATA ACCESS OTHER THAN HDD | ENERGY SAVING MODE 7 | × | × | × | × | × | ○ |
| NETWORK PROCESS | ENERGY SAVING MODE 8 | × | × | × | × | × | △ (ONLY FOR SYSTEM TO CHANGE MODE) |

FIG.10

| ENERGY SAVING MODE  TIME ZONE → | 0:00 THROUGH 4:00 | 4:00 THROUGH 8:00 | ... | 20:00 THROUGH 24:00 |
|---|---|---|---|---|
| ENERGY SAVING MODE 1 | 10 MINUTES | 20 MINUTES | ... | 0 MINUTES |
| ENERGY SAVING MODE 2 | 5 MINUTES | 0 MINUTES | ... | 0 MINUTES |
| ENERGY SAVING MODE 3 | 0 MINUTES | 7 MINUTES | ... | 0 MINUTES |
| ... | | | | |

FIG.11

| ENERGY SAVING MODE  TIME ZONE → | MONDAY 0:00 THROUGH 2:00 | MONDAY 2:00 THROUGH 4:00 | ... | TUESDAY 0:00 THROUGH 2:00 | ... |
|---|---|---|---|---|---|
| ENERGY SAVING MODE 1 | 10 MINUTES | 20 MINUTES | ... | 0 MINUTES | ... |
| ENERGY SAVING MODE 2 | 5 MINUTES | 0 MINUTES | ... | 0 MINUTES | ... |
| ENERGY SAVING MODE 3 | 0 MINUTES | 7 MINUTES | ... | 0 MINUTES | ... |
| ... | | | | | |

FIG.12

| ↓DEVICE  TIME ZONE→ | 0:00 THROUGH 2:00 | 2:00 THROUGH 4:00 | ... | 22:00 THROUGH 24:00 |
|---|---|---|---|---|
| IMAGE INPUT PART | 10 MINUTES | 20 MINUTES | ... | 0 MINUTES |
| IMAGE FORMING PART | 5 MINUTES | 0 MINUTES | ... | 0 MINUTES |
| OPERATION AND DISPLAY PART | 0 MINUTES | 7 MINUTES | ... | 0 MINUTES |
| ... | | | | ... |

FIG.13

| ↓DEVICE  TIME ZONE→ | 0:00 THROUGH 2:00 | 2:00 THROUGH 4:00 | ... | 22:00 THROUGH 24:00 |
|---|---|---|---|---|
| IMAGE INPUT PART | 110 MINUTES | 20 MINUTES | ... | 2100 MINUTES |
| IMAGE FORMING PART | 20 MINUTES | 0 MINUTES | ... | 1500 MINUTES |
| OPERATION AND DISPLAY PART | 5 MINUTES | 7 MINUTES | ... | 30 MINUTES |
| ... | | | | ... |

SELECTING FROM A PLURAL OF ENERGY SAVING MODES

BACKGROUND OF THE INVENTION

1. Field of the Invention

Embodiments of the present invention relate to an image processing apparatus and a control method for the image processing apparatus. In particular, embodiments of the present invention relate to an art of selecting a suitable one of plural energy saving modes.

2. Description of the Related Art

Japanese Laid-Open Patent Application No. 2005-215316 discloses a configuration in which in order to automatically carry out a suitable setting of an energy saving operation mode, the number of times of copying operations are counted for each unit period of time, and an energy saving operation mode to be assigned is automatically determined for each unit period of time according to the thus-counted frequency of times of the copying operations. In this configuration, the energy saving operation mode is automatically determined. However, an optimum setting may not necessarily be achieved in some cases.

In a technical field of business machines including a copier, a multifunction peripheral, and so forth, various functions have been introduced for the purpose of saving users' costs. As one of the various functions, an energy saving function of providing a mode of saving power consumption exists. In this energy saving function, the states of the power supplied to devices (for example, a monitor, an image forming engine, and so forth) included in a business machine are changed, and thus, power consumption is reduced. As specific examples of changing the states of the power supplied include, for example, controlling the temperature of the devices, turning on/off the power supply of the devices, and forth.

In such an energy saving function of the business machine, problems, described below, may occur. It is noted that although an image forming apparatus is used as one example of a business machine below, the problems may not be unique to the image forming apparatus, and may be common to business machines, information processing apparatuses, image processing apparatuses, and so forth, which have power saving functions.

A first problem is that to set setting values for power saving modes may be troublesome. In many cases, a user of an image forming apparatus may set setting values (i.e., a time at which the image forming apparatus is to enter a power saving mode, a timer value to be counted before the image forming apparatus actually enters the power saving mode, or such) for each one of plural energy saving states.

As another problem, for a case where setting values for power saving modes are set automatically, it may not be easy to previously determine suitable setting values which are used to automatically set the setting values for the power saving modes. For example, a certain function of an image forming apparatus cannot be used when the image forming apparatus enters an energy saving mode. Therefore, when the certain function of the image forming apparatus is used, the image forming apparatus is caused to return from the energy saving mode to a regular mode. In this regard, very large power may be consumed when the image forming apparatus is caused to return from the energy saving mode to the regular mode. For example, a fixing unit used in an electrophotographic system by which an image having been transferred to paper is fixed by using heat and pressure may consume very large power when being started up along with returning of the image forming apparatus from the energy saving mode to the regular mode. Therefore, power consumption may increase when the image forming apparatus enters the energy saving mode each time the image forming apparatus being used is finished, for example, in a time zone in which the frequency of use of the image forming apparatus is high. Thus, it may be not be easy to determine the optimum setting value for the energy saving mode.

It is noted that the setting values for the energy saving modes may include, as mentioned above, for example, a time at which an image forming apparatus is caused to enter the energy saving mode, a timer value to be counted before the image forming apparatus actually enters the energy saving mode, or such. Further, for an image forming apparatus having plural energy saving modes, it may not be obvious which one of the plural energy saving modes is to be selected for each time zone.

SUMMARY OF THE INVENTION

According to an embodiment of the present invention, an image processing apparatus includes first information in which plural functions of the image processing apparatus and plural energy saving modes that are minimum necessary for performing respective ones of the plural functions of the image processing apparatus are associated with each other. The image processing apparatus further includes a counting process part that counts for every unit period of time a usage period of time during which the image processing apparatus is used for a function of the plural functions in a case where the function of the image processing apparatus is used. The image processing apparatus further includes an energy saving mode entering process part that, when the image processing apparatus is to enter any one of the plural energy saving modes, determines one of the plural energy saving modes based on the counting result for every unit period of time to which a time to enter any one of the plural energy saving modes belongs, and causes the image processing apparatus to enter the determined energy saving mode.

According to another embodiment of the present invention, a control method of an image processing apparatus includes counting for every unit period of time a usage period of time during which the image processing apparatus is used for a function of plural functions in a case where the function of the image processing apparatus is used. The control method further includes determining, when the image processing apparatus is to enter any one of plural energy saving modes, one of the plural energy saving modes based on the counting result for every unit period of time to which a time to enter any one of the plural energy saving modes belongs, and causing the image processing apparatus to enter the determined energy saving mode.

Other aspects of the embodiments will become more apparent from the following detailed description when read in conjunction with the accompanying drawings.

BRIEF DESCRIPTION OF THE DRAWINGS

FIG. 3 shows an example of information (information A) in which a usage period of time is counted for every "predetermined unit period of time" and for every "energy saving mode minimum necessary upon realizing a used function";

FIG. 4 shows an example of information (information B) indicating a result of adding up the usage periods of time included in the information of FIG. 3;

FIG. 5 shows information (information C) in which functions of the multifunction peripheral of the embodiment and energy saving modes minimum necessary (i.e., consuming lowest power) upon realizing the respective functions the multifunction peripheral are associated with one another;

FIG. 10 shows an example of the information (information A) of FIG. 3 in a variant embodiment in which the predetermined unit period of time can be changed;

FIG. 11 shows one example of the information (information A) of FIG. 3 in a variant embodiment in which a counting unit period of time in the information A is determined as one week;

FIG. 12 shows one example of information (information D) corresponding to the information (information A) of FIG. 3 for a variant embodiment in which a usage periods of time of the multifunction peripheral are counted for every device;

FIG. 13 shows one example of information (information E) corresponding to the information (information B) of FIG. 4 for the variant embodiment in which usage periods of time of the multifunction peripheral are counted for every device, and indicating a result of adding up the usage periods of time included in the information of FIG. 12;

DETAILED DESCRIPTION OF THE EMBODIMENTS

One aspect of an embodiment of the present invention is to provide an image processing apparatus and a control method for the image processing apparatus, in which a setting of an energy saving mode is automatically determined.

An embodiment of the present invention is an embodiment in which the present invention is applied to a multifunction peripheral (simply abbreviated as a MFP, hereinafter) which can be used as a printer, a scanner, a copier, a facsimile machine, and so forth.

The MFP in the embodiment has plural energy saving modes (i.e., energy saving states or energy saving functions). By automatically entering any appropriate one of the plural energy saving modes, reduction of power consumption and improvement of availability are achievable.

The MFP in the embodiment counts usage periods of time of the functions being used by the user for every "predetermined unit period of time" and for every "energy saving mode minimum necessary for using the function", and analyzes the usage periods of time of the MFP.

(Configuration)

Figure 1:
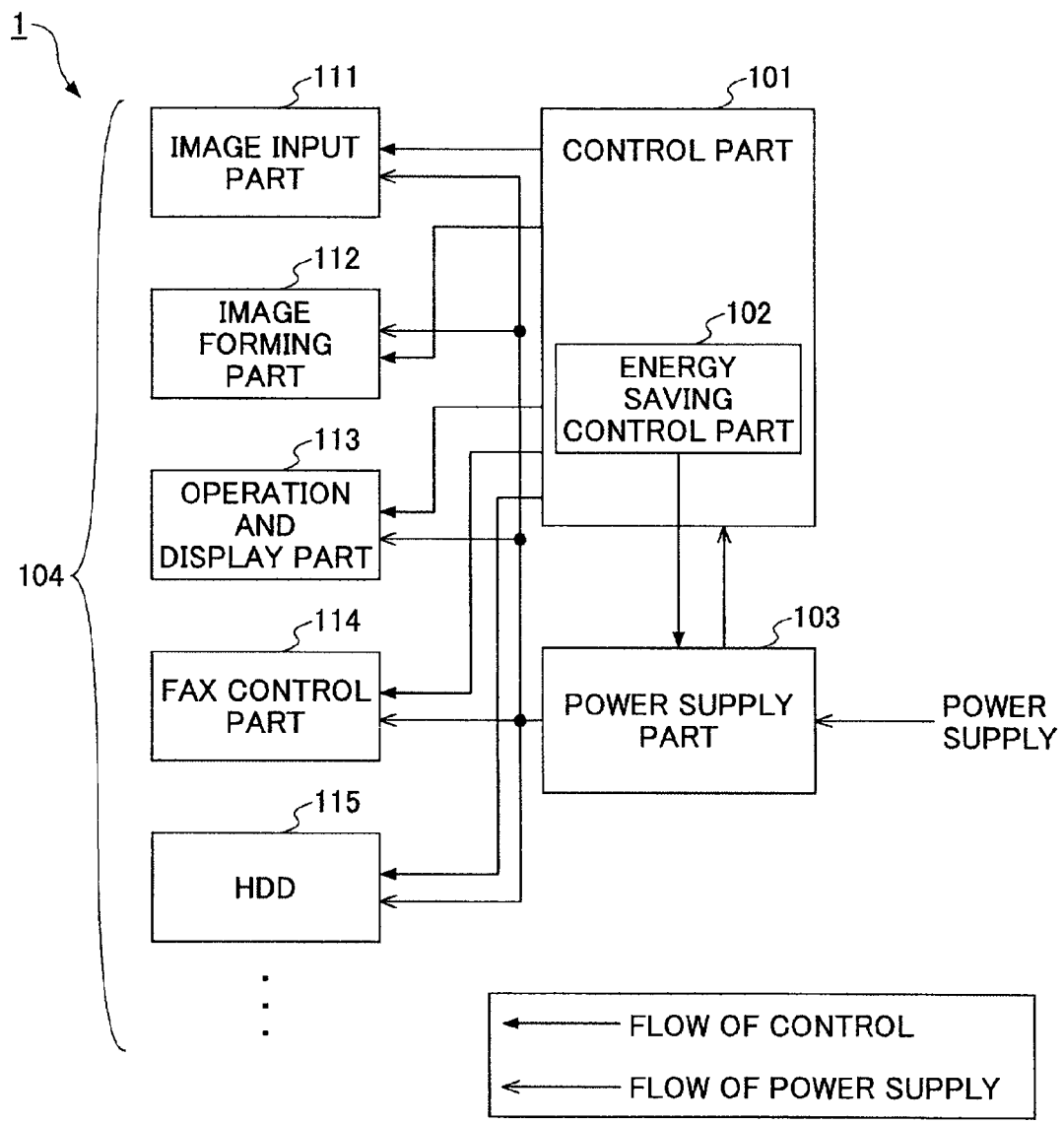
FIG. 1 is a block diagram showing an example of a configuration of a multifunction peripheral according to an embodiment of the present invention.

FIG. 1 shows one example of a configuration of the MFP in the embodiment of the present invention.

The MFP 1 in the embodiment includes a control part 101, an energy saving control part 102, a power supply part 103 and a device group 104.

The control part 101 controls the entirety of the MFP 1. For example, the control part 101 is realized by a CPU (Central Processing Unit) controlled by software, an ASIC (Application Specific Integrated Circuit), or such. As shown in FIG. 1, the control part 101 controls respective devices (described later) included in the device group 104 and the power supply part 103. It is noted that the energy saving control part 102 (described later) may carry out all of the control of the power supply part 103.

Further, the control part 101 includes an internal clock (not shown), a register (storing information of usage periods of time of the MFP 1, and so forth), and so forth (not shown).

The energy saving control part 102 controls the power supply part 103 based on information of usage periods of time of the MFP 1 that the control part 101 obtains and stores, information of the time obtained from the internal clock (which information may be information indicating which time zone the current time belongs to, as described later), and so forth. The energy saving control part 102 has a timer function that measures an elapsed period of time.

The power supply part 103 supplies power to the control part 101 and the device group 104 under the control of the energy saving control part 102. For each energy saving mode, assigned by the energy saving control part 102, devices for which power is to be supplied have been determined (described later with reference to FIG. 5).

For example, in an energy saving mode 1, power supplied to a facsimile control part 114 is stopped or reduced. In an energy saving mode 2, power supplied to an image forming part 112 is stopped or reduced. In an energy saving mode 6, power supplied to an image input part 111, the image forming part 112 and an operation and display part 113 is stopped or reduced.

Further, in the MFP 1 in the embodiment, a correspondence between the functions to be used by the user and the energy saving modes minimum necessary for carrying out the respective functions is established and stored by the energy saving control part 102 as "information C" (described later with reference to FIG. 5).

Respective devices included in the device group 104 are, for example, the image input part 111, the image forming part 112, the operation and display part 113, the facsimile control part 114 and an HDD (hard disk drive) 115. The image input part 111 reads an original image by using a scanner or such.

The image forming part 112 prints an image by using an electrophotographic system or such. The operation and display part 113 receives operation inputs from the user through a touch panel, and so forth, and displays various items of information to the user. The facsimile control part carries out transmission and reception of images through facsimile communication according to G3 (group 3) type facsimile, for example. The HDD 115 stores various items of information such as images. These parts (i.e., devices) operate as power is supplied thereto by the power supply part 103. Depending on the function used by the user, different devices will be used according to the user's used function. For example, when the copy function is used, power is supplied to the image input part 111, the image forming part 112 and the operation and display part 113, and power supplied to the facsimile control part 114 is stopped or reduced (see FIG. 5). It is noted that in FIG. 5, the symbol "○" indicates that power is supplied, and the symbol "X" indicates that power supplied is stopped or reduced. It is noted that "power is supplied" means that power is supplied in a state where power is not reduced.

Figure 2:
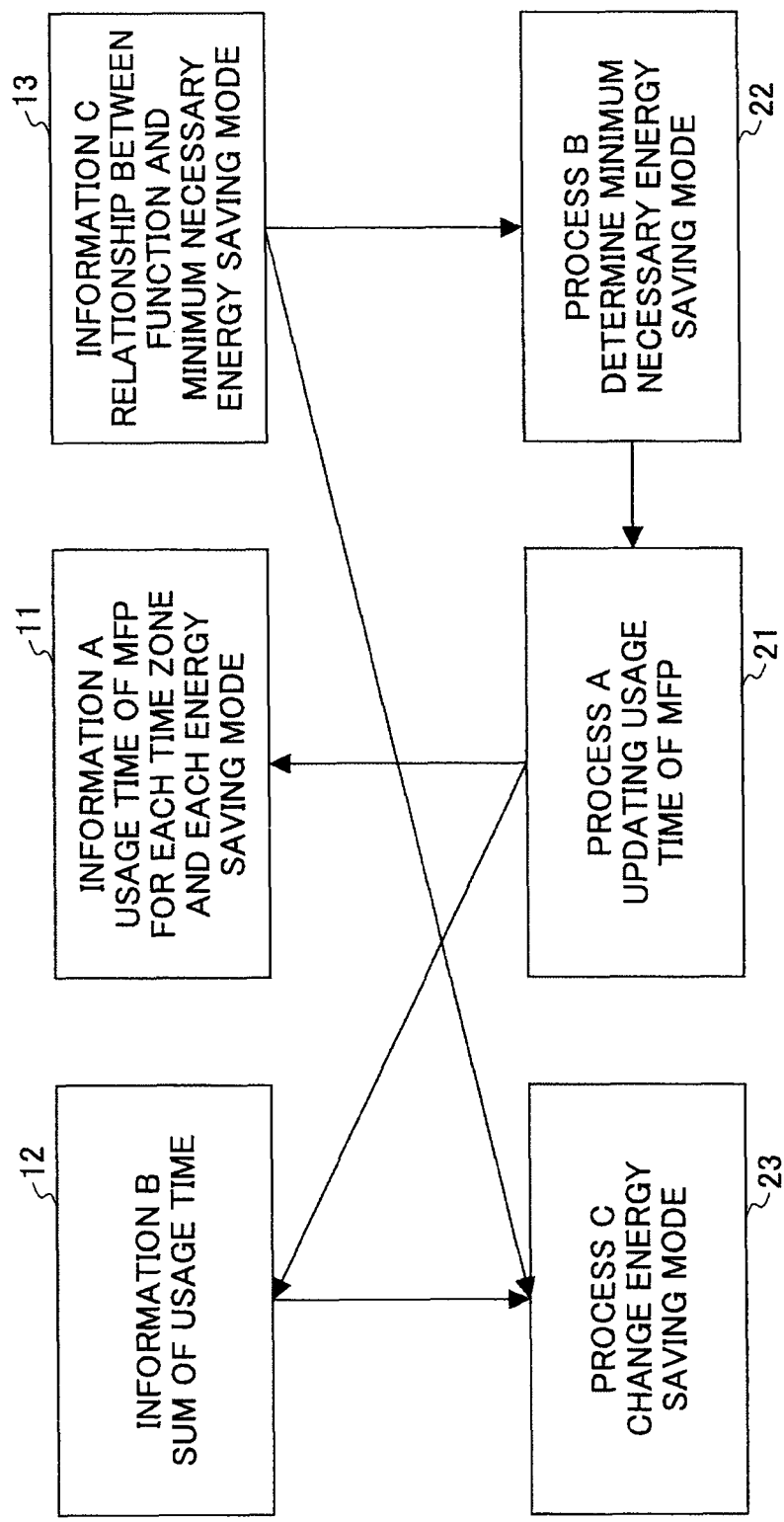
FIG. 2 illustrates a relationship between information necessary for carrying out processes of the embodiment of the present invention and the processes of the embodiment of the present invention.

Next, a specific method of performing the operation of counting usage periods of time of the MFP 1 and analyzing the usage periods of time in the embodiment will be described. FIG. 2 illustrates a relationship between information and processes necessary upon performing the above-mentioned operation. Information A, B and C (11, 12 and 13) and processes A, B and C (21, 22 and 23), shown in FIG. 2, will now be described.

Information A (11) in FIG. 2 is the second information obtained from counting a usage period of time for every "predetermined unit period of time" (i.e., every time zone) and for every "energy saving mode minimum necessary for performing a used function". The information A (11) will be described later with reference to FIG. 3.

Information B (12) in FIG. 2 is the third information obtained from adding up the above-mentioned information A (11) having been obtained from counting a usage period of time for every "predetermined unit period of time" (i.e., every time zone) and for every "energy saving mode minimum necessary for performing the used function". The information B (12) will be described later with reference to FIG. 4.

Information C (13) in FIG. 2 is the first information that associates functions of the MFP 1 to be used by the user with the energy saving modes minimum necessary (i.e., having the minimum power consumptions) for performing the respective functions and devices to supply power in the respective power saving modes. The information C (13) will be described later with reference to FIG. 5.

A process A (21) in FIG. 2 is a process of updating the information of the usage periods of time of the MFP 1, i.e., the information A and the information B. When the user uses the MFP 1, the energy saving control part 102 updates the information A and the information B according to the periods of time during which the MFP 1 is used and the used functions of the MFP 1. The process A (21) will be described later with reference to FIG. 6.

A process B (22) in FIG. 2 is a process of determining the minimum necessary energy saving mode (i.e., the energy saving mode that consumes the least power) for performing each function of the MFP 1. The energy saving control part 102 determines, from the function of the MFP 1 which has been used by the user and the information that associates the functions with the energy saving modes (i.e., the information C), the energy saving mode minimum necessary for performing the function. Further, the energy saving control part 102 uses, in the process A, the thus-determined energy saving mode minimum necessary for performing the function from the process B. The process B (22) will be described later with reference to FIG. 7.

A process C (23) in FIG. 2 is a process of changing the energy saving mode of the MFP 1 (or entering any one of the energy saving mode). The energy saving control part 102 causes the MFP 1 to enter a certain energy saving mode, by using the information B and the information C. The process C (23) will be described later with reference to FIG. 7.

FIG. 3 shows an example of the information A.

The ordinate in FIG. 3 represents the energy saving mode minimum necessary (i.e., consuming the least power) for performing each function that the MFP 1 has, and the abscissa in FIG. 3 represents time zones. In each field of the table of FIG. 3, a usage period of time for every energy saving mode and for every time zone is recorded or updated as a result of the energy saving mode 102 carrying out the process A. The information A of FIG. 3 indicates that, for example, during the time zone of 0:00 through 2:00, the MFP 1 has been used for "10 minutes" for one function for which the energy saving mode 1 is minimum necessary for performing this function, and for "5 minutes" for a different function for which the energy saving mode 2 is minimum necessary for performing this different function. It is noted that, as will be described below, under the control of the energy saving control part 102, the MFP 1 enters the energy saving mode that is minimum necessary for performing a function when this function is used by the user. Therefore, for example, "the MFP 1 has been used for "10 minutes" for a function for which the energy saving mode 1 is minimum necessary for performing this function" means "the MFP 1 has been used for "10 minutes" for the function in the energy saving mode 1 that is minimum necessary for performing this function".

It is noted that the information A of FIG. 3 is initialized once a day. That is, the numeric values in all the fields of the table of FIG. 3 are overwritten with the number "0", respectively, once a day. Further, the information A of FIG. 3 is an example where a predetermined unit period of time is 2 hours. That is, in the example, a usage period of time of the MFP 1 is counted in 2-hour units or for every 2 hours.

FIG. 4 shows an example of the information B.

The ordinate of FIG. 4 represents, the same as in FIG. 3, the energy saving mode minimum necessary (i.e., consuming the least power) for performing each function that the MFP 1 has, and the abscissa in FIG. 4 represents time zones. In the respective fields of the table of FIG. 4, sums of the usage periods of time of the MFP 1 are updated for every energy saving mode and for every time zone as a result of the energy saving control part 102 carrying out the process A. More specifically, the information B of FIG. 4 is, as a sum for plural days, for example, during the time zone of 0:00 through 2:00, the MFP 1 has been used for "110 minutes" for a function for which the energy saving mode 1 is minimum necessary for performing this function, for "20 minutes" for a different function for which the energy saving mode 2 is minimum necessary for performing this different function and for "5 minutes" for a further different function for which the energy saving mode 3 is minimum necessary for performing this further different function. As mentioned above, under the control of the energy saving control part 102, the MFP 1 enters the energy saving mode that is minimum necessary for performing a function when this function is used by the user. Therefore, for example, "the MFP 1 has been used for "110 minutes" for a function for which the energy saving mode 1 is minimum necessary for performing this function" means "the MFP 1 has been used for "110 minutes" for the function in the energy saving mode 1 that is minimum necessary for performing this function".

The information B of FIG. 4 is updated once a day by using the information A (FIG. 3). That is, the numeric values in the respective fields of the table of FIG. 3 are added to the corresponding fields of the table of FIG. 4, once a day. The same as the information A of FIG. 3, the information B of FIG. 4 is an example where the predetermined unit period of time is 2 hours.

FIG. 5 shows an example of the information C.

As shown in FIG. 5, the information C is such that the respective functions that the MFP 1 has, the energy saving modes minimum necessary (consuming the least power) for performing the functions and the devices to which power is supplied for the respective energy saving modes are associated with one another. By using the associated relationship indicated by the information C, the energy saving control part 102 determines the energy saving mode minimum necessary for performing the function, from the function used by the user, in the process B. According to the information C, for example, it is seen that the energy saving mode minimum necessary for performing the "copy" function is the "energy saving mode 1", and in the "energy saving mode 1", the power supply part 103 supplies power to the image input part 111, the image forming part 112, the operation and display part 113, the HDD 115 and the control part 101 (indicated by the symbol "○" in FIG. 5), under the control of the energy saving control part 102.

For example, in a case where the MFP 1 is caused to carry out the "copy" function, when the user selects the copy function by inputting an instruction using the operation and display part 113, the image input part 111 reads an image of an original in response to the instruction, and stores the read image in the HDD 115, and the image forming part 112 reads the image from the HDD 115 and prints the image, under the control of the control part 101. Thus, upon performing the copy function, the image input part 111, the image forming part 112, the operation and display part 113, the HDD 115 and the control part 101 are used. Therefore, the energy saving mode minimum necessary for carrying out (or performing) the copy function is the energy saving mode 1 of supplying power to these devices as shown in FIG. 5. It is noted that a usage period of time of the MFP 1 for the copy function or the copy function of the MFP 1 being used may be counted from the time the user inputs the instruction from the operation and display part 113 to the time the image forming part 112 finishes printing the image, or may be counted from the time the corresponding application software (not shown) is started up to the time the execution of the application software is stopped, for example.

Similarly, in a case where the MFP 1 is caused to carry out the "facsimile transmission" function, when the user selects the facsimile function by inputting an instruction using the operation and display part 113, the image input part 111 reads an image of an original in response to the instruction, and stores the read image in the HDD 115, and the facsimile control part 114 reads the image from the HDD 115 and transmits the image through facsimile communication. Thus, upon performing the facsimile transmission function, the image input part 111, the operation and display part 113, the HDD 115, the facsimile control part 114 and the control part 101 are used. Therefore, the energy saving mode minimum necessary for carrying out (or performing) the facsimile transmission function is the energy saving mode 2 of supplying power to these devices as shown in FIG. 5. It is noted that a usage period of time of the MFP 1 for the facsimile trans-mission function or the facsimile transmission function of the MFP 1 being used may be counted from the time the user inputs the instruction from the operation and display part 113 to the time the facsimile control part 114 finishes transmission of the image, or may be counted from the time the corresponding application software (not shown) is started up to the time the execution of the application software is stopped, for example.

Similarly, in a case where the MFP 1 is caused to carry out the "printer printing" function, when a printing instruction including an image is received from an external PC (personal computer) or such, the received image is stored in the HDD 115, and the image forming part 112 reads the image from the HDD 115 and prints the image, under the control of the control part 101. At this time, a LED (light-emitting diode) of the operation and display part 113 is turned on to indicate the reception of the printing instruction, and so forth. Thus, upon performing the printer printing function, the image forming part 112, the operation and display part 113 (however, only the LED thereof), the HDD 115 and the control part 101 are used. Therefore, the energy saving mode minimum necessary for carrying out (or performing) the printer printing function is the energy saving mode 3 of supplying power to these devices as shown in FIG. 5. It is noted that a usage period of time of the MFP 1 for the printer printing function or the printer printing function of the MFP 1 being used may be counted from the time the printing instruction is received by the MFP 1 to the time the image forming part 112 finishes the printing the image, or may be counted from the time the corresponding application software (not shown) is started up to the time the execution of the application software is stopped, for example.

Similarly, in a case where the MFP 1 is caused to carry out the "facsimile reception printing" function, when the facsimile control part 114 receives an image through facsimile communication, the received image is stored in the HDD 115, and the image forming part 112 reads the image from the HDD 115 and prints the image, under the control of the control part 101. At this time, a LED (light-emitting diode) of the operation and display part 113 is turned on to indicate the reception of the image, and so forth. Thus, upon performing the facsimile reception printing function, the image forming part 112, the operation and display part 113 (however, only the LED thereof), the HDD 115, the facsimile control part 114 and the control part 101 are used. Therefore, the energy saving mode minimum necessary for carrying out (or performing) the printer printing function is the energy saving mode 4 of supplying power to these devices. It is noted that a usage period of time of the MFP 1 for the facsimile reception printing function or the facsimile reception printing function of the MFP 1 being used may be counted from the time the image is received by the facsimile control part 114 to the time the image forming part 112 finishes the printing the image, or may be counted from the time the corresponding application software (not shown) is started up to the time the execution of the application software is stopped, for example.

Similarly, in a case where the MFP 1 is caused to carry out the "printer storage" function, when a storage instruction including an image is received from an external PC (personal computer) or such, the received image is stored in the HDD 115, under the control of the control part 101. At this time, a LED (light-emitting diode) of the operation and display part 113 is turned on to indicate the reception of the storage instruction, and so forth. Thus, upon performing the printer storage function, the operation and display part 113 (however, only the LED thereof), the HDD 115 and the control part 101 are used. Therefore, the energy saving mode minimum necessary for carrying out (or performing) the printer storage function is the energy saving mode 5 of supplying power to these devices. It is noted that a usage period of time of the MFP 1 for the printer storage function or the printer storage function of the MFP 1 being used may be counted from the time the storage instruction is received by the MFP 1 to the time the storage of the image in the HDD 115 is finished, or may be counted from the time the corresponding application software (not shown) is started up to the time the execution of the application software is stopped, for example.

Similarly, in a case where the MFP 1 is caused to carry out the "facsimile reception storage" function, when the facsimile control part 114 receives an image through facsimile communication, the received image is stored in the HDD 115, under the control of the control part 101. At this time, a LED (light-emitting diode) of the operation and display part 113 is turned on to indicate the reception of the image, and so forth. Thus, upon performing the facsimile reception storage function, the operation and display part 113 (however, only the LED thereof), the HDD 115, the facsimile control part 114 and the control part 101 are used. Therefore, the energy saving mode minimum necessary for carrying out (or performing) the facsimile reception storage function is the energy saving mode 6 of supplying power to these devices. It is noted that a usage period of time of the MFP 1 for the facsimile reception storage function or the facsimile reception storage function of the MFP 1 being used may be counted from the time the image is received by the facsimile control part 114 to the time the storage of the image in the HDD 115 is finished, or may be counted from the time the corresponding application software (not shown) is started up to the time the execution of the application software is stopped, for example.

Next, in a case where the MFP 1 is caused to carry out the "data access other than HDD" function, the control part 101 receives an access request from an external PC or such for a device such as a NVRAM (non-volatile random access memory) (not shown), other than the HDD 115, to which power is supplied at all times. Therefore, the control part 101 is used upon carrying out (or performing) the data access other than HDD function, and thus, the energy saving mode minimum necessary for carrying out (or performing) the data access other than HDD function is the energy saving mode 7 of supplying power to the control part 101. It is noted that a usage period of time of the MFP 1 for the data access other than HDD function or the data access other than HDD function of the MFP 1 being used may be counted from the time the access request is received by the control part 101 to the time the corresponding access is finished, or may be counted from the time the corresponding application software (not shown) is started up to the time the execution of the application software is stopped, for example.

Next, the "network process" function is a function for carrying out a process via a communication network. For example, the "network process" function is starting power to be supplied to necessary devices (such as the control part 101 and/or the facsimile control part 114) upon receiving data such as an image via the communication network in the above-mentioned facsimile reception printing function, facsimile reception storage function, printer printing function, printer storage function, and so forth, and causing the MFP 1 to enter the corresponding energy saving mode. Therefore, a "system to change mode" shown in FIG. 5 means a system that detects incoming data such as an image via the communication network, starts power to be supplied to the necessary devices, and causes the MFP 1 to enter the corresponding energy saving mode. Therefore, the above-mentioned "system to change mode" included in the control part 101 is used for carrying out (performing) the network process function, and thus, the energy saving mode minimum necessary for carrying out (or performing) the network process function is the energy saving mode 8 of supplying power to the "system to change mode" of the control part 101. It is noted that a usage period of time of the MFP 1 for the network process function or the network process function of the MFP 1 being used may be counted from the time the above-mentioned "system to change mode" included in the control part 101 is started up to the time the operation of "system to change mode" is finished, or may be counted from the time the corresponding application software (not shown) is started up to the time the execution of the application software is stopped, for example.

It is noted that the "functions that the user uses" are not necessarily limited to those that are used by the user as a result of the user actually operating the operation and display part 113 of the MFP 1, and includes also those that are automatically carried out such as the function of automatically receiving an image through facsimile communication and storing the same (i.e., the facsimile reception storage function), a function of automatically printing a log when a predetermined time has come, and so forth.

The above-described process A, process B and process C are carried out by the energy saving control part 102. Further, the above-mentioned information A, information B and information C are stored in the register (not shown) that the control part 101 has, or such.

Below, operation of the MFP 1 to carry out a process of counting usage periods of time, and an energy saving mode changing process of automatically changing the energy saving mode into the optimum energy saving mode based on the counting result will be described, with reference to flowcharts of FIG. 6 and FIG. 7A.

(Process of Counting Usage Periods of Time)

Figure 6:
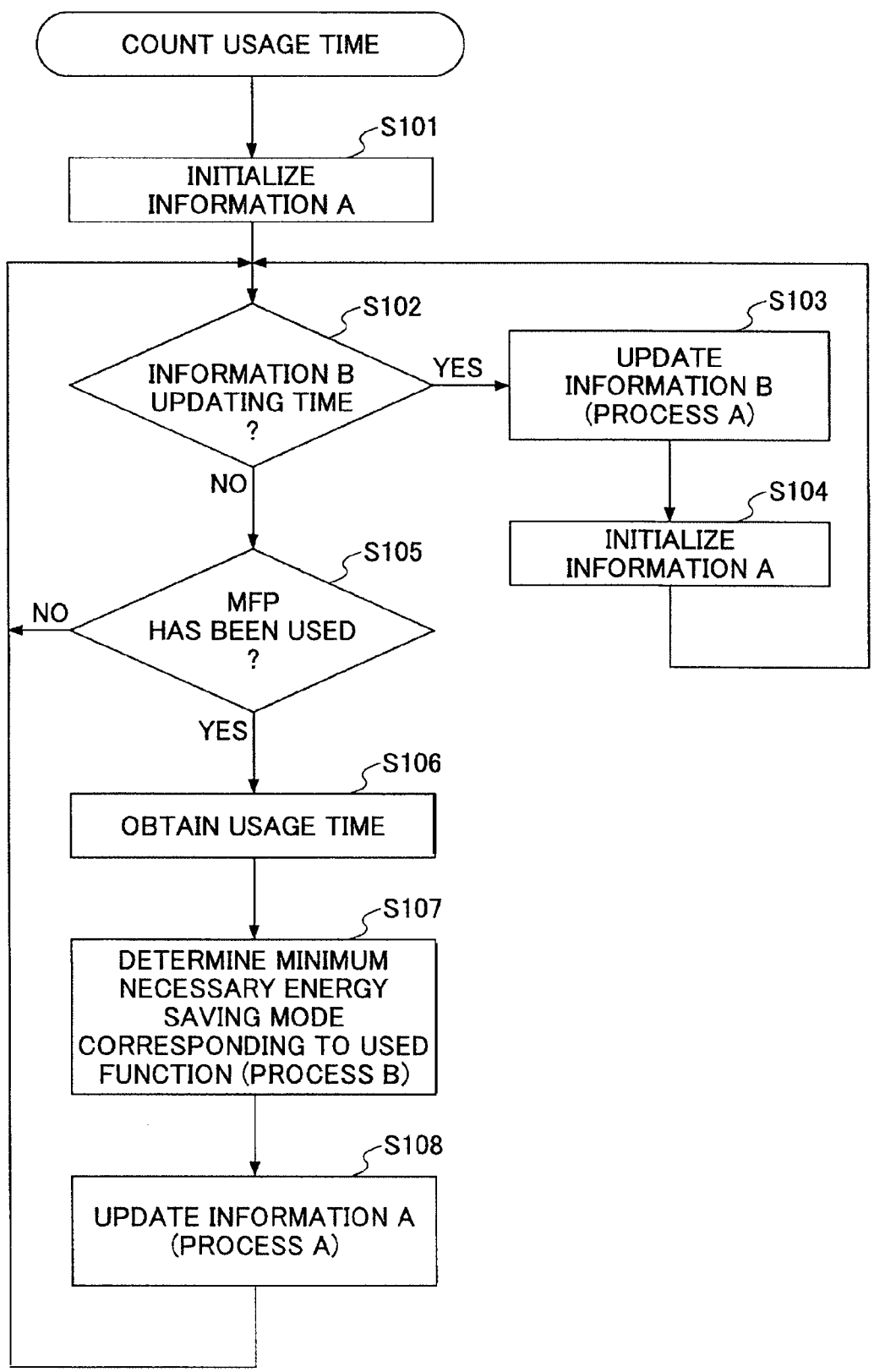
FIG. 6 is a flowchart showing a procedure of a process of counting usage periods of time of the multifunction peripheral.

FIG. 6 shows a procedure of a process of counting usage periods of time in the embodiment.

The energy saving control part 102 of FIG. 1 carries out each step of FIG. 6 unless otherwise stated, and thus, the energy saving control part acts as a counting process part.

First, the information A is initialized (step S101). That is, as mentioned above, for example, the numeric values in all the fields of the table shown in FIG. 3 are overwritten with the number "0", respectively.

Next, it is determined whether the current time is an updating time for the information B (step S102). As the updating time for the information B, any time of day, such as zero o'clock, may be set. Further the determination as to whether the current time is an updating time for the information B may be carried out by using time information obtained from the internal clock (not shown).

In a case where the current time is the updating time for the information B (step S102 YES), the information B is updated by using the information A (step S103, which is the process A), the information A is initialized, and step S102 is returned to (step S104). As mentioned above, updating the information B is carried out by using the information A in such a state shown in FIG. 3. For example, in a case where the current time is the updating time (in the above-mentioned example, zero o'clock), the numeric values in the respective fields of the information A, which indicate counting results of usage periods of time for the past 24 hours, are added to the numeric values in the corresponding fields of the information B, respectively. For example, assuming that the information A of FIG. 3 and the information B of FIG. 4 are those in the current states, respectively, the numeric values in the respective fields of the table of FIG. 3 are added to the numeric values in the corresponding fields of the table of FIG. 4. For example, according to FIG. 3, during "0:00 through 2:00", the usage period of time for which the MFP 1 has been used for the function in the energy saving mode 1 is "10 minutes". Therefore, the value of the "10 minutes" is added to the value "110 minutes" (sum) in the corresponding field of the table of FIG. 4. As a result, "120 minutes" (i.e., 10+110=120) is obtained, and the existing "110 minutes" is overwritten with "120 minutes" in the corresponding field of the table of FIG. 4. Thus, this field of FIG. 4 is rewritten from "110 minutes" into "120 minutes", in this example.

In a case where the current time is not the updating time of the information B (step S102 NO), it is determined whether the user has used the MFP 1 (step S105). In a case where the user has used the MFP 1 (step S105 YES), the usage period of time of the user having used the MFP 1 is obtained (step S106). As the usage period of time, one counted by the timer function that the energy saving control part 102 has may be used. In a case where the user has not used the MFP 1 (step S105 NO), the process returns to step S102.

After step S106 is carried out, the energy saving mode minimum necessary for performing the function of the MFP 1 having been thus used by the user is determined with reference to the information C (step S107, which is the process B shown in FIG. 2). Next, the information A is updated based on the energy saving mode determined in step S107 and the usage period of time obtained in step S106 (step S108, which is the process A). Updating of the information A means to add the obtained usage period of time to the numeric value in the field determined by the time zone to which the current time belongs and the energy saving mode determined in step S107, in the information A.

For example, it is assumed that the current time is between 2 o'clock and 4 o'clock (for example, 3 o'clock), FIG. 3 indicates the current state of the information A, the determined energy saving mode is the energy saving mode 1, and the obtained usage period of time is 5 minutes. In this assumed example, in the information A of FIG. 3, the current value is "20 minutes" in the field of 2:00 through 4:00 and the energy saving mode 1. Therefore, the same field is overwritten with "25 minutes" obtained from adding "5 minutes" to "20 minutes". Thus, the value in the field is rewritten from "20 minutes" into "25 minutes".

(Energy Saving Mode Changing Process)

Figure 7A:
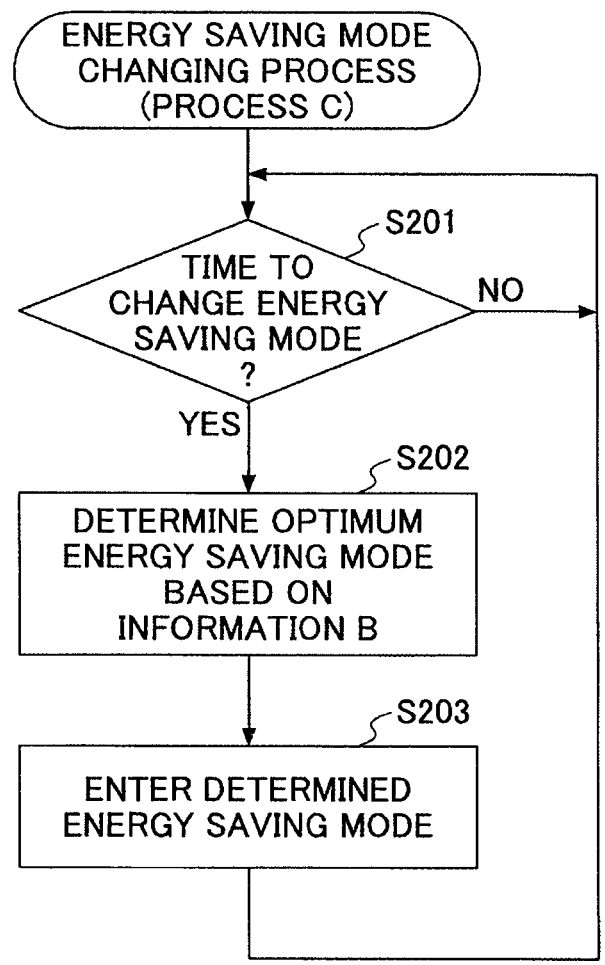
FIG. 7A is a flowchart showing a procedure of an energy saving mode changing process.

FIG. 7A shows a procedure of the energy saving mode changing process in the embodiment.

The energy saving control part 102 of FIG. 1 carries out each step of FIG. 7A unless otherwise stated, and thus, the energy saving control part acts as an energy saving mode entering process part.

The energy saving mode changing process is automatically started when a time to change the energy saving mode has come (step S201 YES). The time to change the energy saving mode is a starting time of every predetermined unit period of time shown in FIGS. 3 and 4. In the example of FIGS. 3 and 4, the time to change the energy saving mode is zero o'clock (0:00), two o'clock (2:00), four o'clock (4:00), . . . .

The "energy saving mode changing process" means a process of, when the time to change the energy saving mode has come, determining the optimum energy saving mode for the time zone to which the current time belongs, and causing the MFP 1 to enter the determined optimum energy saving mode. It is noted that in a case where the optimum energy saving mode for the time zone the current time belongs to accidentally agrees with the optimum energy saving mode determined for the immediately preceding time zone, actually such a control is carried out that the energy saving mode of the MFP 1 is maintained. For the sake of convenience, also a process of maintaining the energy saving mode of the immediately preceding time zone in such a case where the optimum energy saving mode determined at the present time agrees with the immediately preceding optimum energy saving mode, and thus the immediately preceding energy saving mode is not changed will also be referred to as a process of "changing the energy saving mode" or "entering any one of the plural energy saving modes".

When the time to change the energy saving mode has come (step S201 YES), it is determined in step S202 which one of the energy saving modes is optimum based on the information B. This determination is such that the energy saving mode having the largest sum of usage periods of time in the time zone the current time belongs to in the information B is determined as optimum.

Next, the MFP 1 is caused to enter the energy saving mode determined as optimum in step S202 (step S203).

For example, it is assumed that the current time is 22 o'clock, and the largest sum of usage periods of time recorded in the time zone (i.e., the fields of 22:00 through 24:00) having the 22 o'clock as the starting time of the predetermined unit period of time (2 hours) is 2100 minutes of the energy saving mode 1 (see FIG. 4). In the assumed example, the energy saving mode 1 is determined as the optimum energy saving mode (step S202), and the MFP 1 enters the energy saving mode 1. That is, in this case, according to the information C of FIG. 5, power is supplied to the image input part 111, the image forming part 112, the operation and display part 113, the HDD 115 and the control part 101, which are the device to which power is to be supplied according to the information C, while for the other facsimile control part 114, the power is stopped or reduced. Thus, the MFP 1 enters the energy saving mode 1.

It is noted that in a case of a first day of using the MFP 1, no data has been recorded in the information A and the information B. Thus, it is not possible to properly determine the optimum energy saving mode based on the information B in step S202 of FIG. 7A. Therefore, in such a case where no data has been recorded in the information B, the optimum energy saving mode may be determined based on a predetermined default setting. As specific contents of the default setting, for example, such a setting may be used that the energy saving mode 8 (which may be the energy saving mode having the highest energy saving effect) is determined as the optimum energy saving mode for all the time zones.

Thus, according to the embodiment the present invention, the MFP 1 determines the energy saving mode having the largest sum of usage periods of time in each of the time zones of a day, and enters the determined energy saving mode. For example, as mentioned above, in a case where the energy saving mode having the largest sum of usage periods of time in the time zone of 22 o'clock through 24 o'clock is the energy saving mode 1, the MFP 1 enters the energy saving mode 1 at 22 o'clock. According to the information C of FIG. 5, the energy saving mode 1 is the energy saving mode minimum necessary for carrying out the copy function of the functions the MFP 1 has. In this case, from the above-mentioned situation where the energy saving mode having the largest sum of usage periods of time in the time zone of 22 o'clock through 24 o'clock is the energy saving mode 1, it can be seen that for the past days, in particular in this time zone, the period of time in which the copy function has been used is longest. Therefore, it is expected that in this time zone of a day, a period of time in which the copy function of the functions of the MFP 1 is used may be longest. Accordingly, by thus automatically causing the MFP 1 to enter the energy saving mode 1 at the beginning of the time zone of a day, it is not necessary to change the energy saving mode during the time zone as long as the copy function, thus expected as having the longest usage period of time, is used. Thus, during the time zone, the copy function can be carried out while the energy saving mode is left unchanged. Thus, it is possible to avoid a situation that power consumption of the MFP 1 increases because of a change of the energy saving mode.

Operation of the MFP 1 in a case where a function of the MFP 1 is actually used during each time zone after the MFP 1 enters the energy saving mode determined as optimum for the time zone before entering the next time zone is as follows. In the case where a function of the MFP 1 is actually used, the power supply part 103 supplies power to the devices that will be used upon carrying out the function, under the control of the energy saving control part 102. That is, the MFP 1 enters the energy saving mode associated with the function, according to the associating relationship of the information C of FIG. 5, or the energy saving mode of the MFP 1 is changed from the above-mentioned energy saving mode determined as optimum for the time zone into the energy saving mode associated with the function. Then, after the user's usage of the function is finished or the execution of the function is finished, the MFP 1 changes the energy saving mode from the energy saving mode associated with the function into the above-mentioned energy saving mode determined as optimum for the time zone. That is, the MFP 1 returns to the energy saving mode determined as optimum for the time zone. It is noted that at the time of returning to the energy saving mode determined as optimum for the time zone, the timer function may be used to return to the energy saving mode determined as optimum for the time zone after an elapsed predetermined period of time, instead of immediately returning to the energy saving mode determined as optimum for the time zone.

It is noted that when the energy saving mode 8 associated with the network process function shown in FIG. 5 is determined as optimum for the time zone to which the current time belongs, and the MFP 1 enters the energy saving mode 8, power may not be supplied to the operation and display part 113 as shown in FIG. 5. In order that the user can use the copy function, for example, even in such a situation, a configuration may be provided such that when the user presses a power supply key (not shown) as hardware included in the operation and display part 113, power is automatically supplied to the control part 101 and the operation and display part 113 in response thereto, and the MFP 1 enters the corresponding energy saving mode 1 as a result of the user carrying out an operation to input an instruction for a copy operation from the operation and display part 113. That is, the above-mentioned "system to change mode" included in the control part 101 may include a configuration such that when the power supply key is pressed, the power supply part 103 is controlled in response thereto and the power supply part 103 is caused to supply power to the control part 101 and the operation and display part 113 automatically.

Further, in each of the energy saving modes 3, 4, 5 and 6 shown in FIG. 5, power supply to the operation and control part 113 is such that power is supplied only to the LED of the operation and control part 113. In order that the user can use the copy function, for example, even in such a situation, a configuration may be provided such that when the user presses the power supply key, power is automatically supplied to the control part 101 and the operation and display part 113 in response thereto, and the MFP 1 enters the corresponding energy saving mode 1 as a result of the user carrying out an operation to input an instruction for a copy operation from the operation and display part 113. That is, the control part 101 to which power is supplied in each of the energy saving modes 3, 4, 5 and 6 may include a configuration such that when the power supply key is pressed, the power supply part 103 is controlled in response thereto and the power supply part 103 is caused to supply power to the entire part of the operation and display part 113 automatically.

Further, in the example of the information C shown in FIG. 5, the functions of the MFP 1 associated with the energy saving modes minimum necessary for carrying out the functions in a one-for-one basis. However, this embodiment is not necessarily limited to this configuration. That is, a single energy saving mode may be associated with plural functions of the MFP 1 as a common energy saving mode minimum necessary for carrying out any one of the plural functions. That is, the common energy saving mode may be associated with the different functions of the MFP 1 as an energy saving mode minimum necessary for carrying out any one of the different functions. Further, even for a case where energy saving modes minimum necessary for carrying out respective ones of different functions of the MFP 1 are actually different, a common energy saving mode may be associated with the respective different functions of the MFP 1 as an energy saving mode minimum necessary for carrying out any one of the different functions, for a reason concerning an individual configuration of the MFP 1, or such. For example, in the example of FIG. 5, different energy saving modes, i.e., the energy saving mode 3 of not supplying power to the facsimile control part 114 and the energy saving mode 4 of supplying power to the facsimile control part 114 are associated with the different functions, i.e., the printer printing function and the facsimile reception printing, respectively. Then, instead, for these different functions of the MFP 1, i.e., the printer printing function and the facsimile reception printing, the energy saving mode 3 of not supplying power to the facsimile control part 114 may be associated as a common energy saving mode for both functions, or the energy saving mode 4 of supplying power to the facsimile control part 114 may be associated as a common energy saving mode for both functions.

Further, the MFP 1 may include a configuration such that at a timing at which the respective operations shown in the flowcharts are carried out, power is supplied at least to the control part 101.

Other Embodiments

Figure 7B:
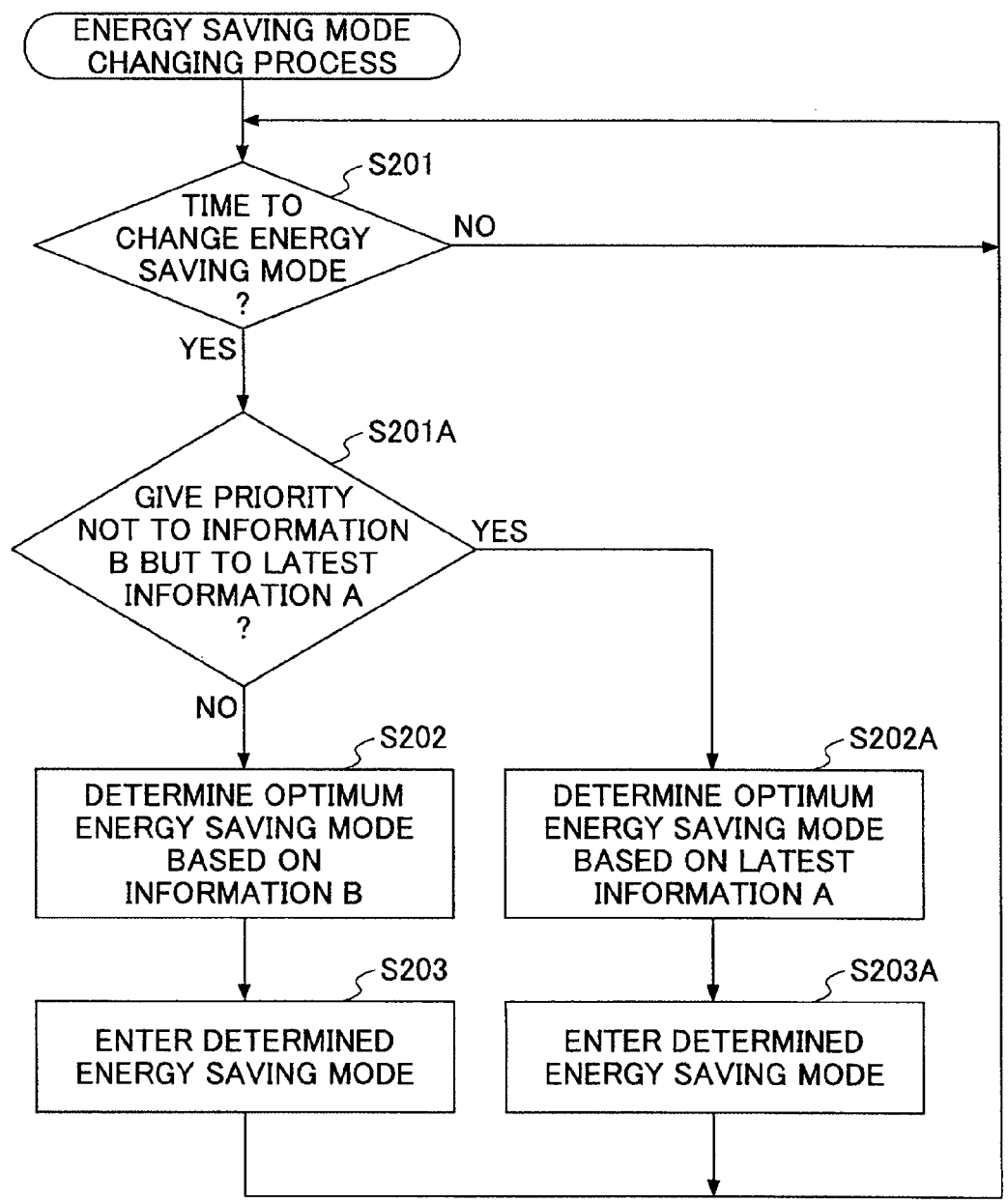
FIG. 7B is a flowchart showing a procedure of a first variant embodiment of the energy saving mode changing process of FIG. 7A.

FIG. 7B is a flowchart showing a procedure of a first variant embodiment of the energy saving mode changing process shown in FIG. 7A.

In an example of FIG. 7B, different from FIG. 7A, at a time of the energy saving mode changing operation, in a certain condition, the optimum energy saving mode is determined based on the latest information A instead of the information B. More specifically, in a case where there is an energy saving mode in the latest information A having a usage period of time of the MFP 1 in the time zone the time to change the energy saving mode belongs to equal to or more than a predetermined percentage of the predetermined unit period of time, the MFP 1 enters this energy saving mode regardless of the information B. Below, detailed description will be made with reference to FIG. 7B.

The same as in the case of FIG. 7A, the energy saving control part 102 carries out the respective steps of the flowchart of FIG. 7A, unless otherwise stated.

The same as in the case of FIG. 7A, the energy saving mode changing process is automatically started when a time to change the energy saving mode has come (step S201 YES).

In the case of FIG. 7B, when a time to change the energy saving mode has come (step S201 YES), the latest information A is read, and it is determined whether the latest information A is used in preference to the information B when the optimum energy saving mode is to be determined (step S201A). It is noted that as mentioned above, the information A is initialized once a day. Therefore, the contents of the latest information A before being initialized is stored in the register of the control part 101, and the thus-stored contents of the latest information A are read in step S201A.

For example, assuming that the current time is 22 o'clock, for example, it is determined in step S201A whether there is an energy saving mode, in the latest information A in particular in the fields of the time zone the time 22 o'clock to change the energy saving mode belongs to, having the usage period of time of the MFP 1 equal to or more than a predetermined percentage (for example, 80%) of the predetermined unit period of time (i.e., 2 hours). In these fields of the latest information A, the usage periods of time in the time zone of 22 o'clock through 24 o'clock on the preceding day are recorded. 80% of 2 hours is 96 minutes (i.e., 120 minutes X 0.8). Therefore, in this example, in step S201A, it is determined whether there is an energy saving mode having the usage period of time in which the MFP 1 has been used equal to or more than 96 minutes exists in the time zone of 22 o'clock through 24 o'clock in the latest information A.

For example, when the usage period of time of the energy saving mode 4 is 100 minutes in the time zone of 22 o'clock through 24 o'clock in the latest information A, since 100 minutes is more than the predetermined percentage (i.e., 96 minutes) of the predetermined unit period of time (i.e., 120 minutes), the energy saving mode having the usage period of time of the MFP 1 in the time zone the time to change the energy saving mode belongs to equal to or more than the predetermined percentage of the predetermined unit period time exists in the latest information A. Therefore, the determination result of step S201A becomes YES.

On the other hand, in a case where no energy saving mode having the usage period of time of the MFP 1 equal to or more than the predetermined percentage (96 minutes) of the predetermined unit period of time (120 minutes) exists in the time zone of 22 o'clock through 24 o'clock, the determination result of step S201A becomes NO.

In the case where the determination result of step S201A is NO, it is determined in step S202 which energy saving mode is optimum, based on the information B. This determination is the same as the determination in step S202 of FIG. 7A. Next, the same as in the case of FIG. 7A, the MFP 1 is caused to enter the energy saving mode determined in step S202 as optimum (step S203).

On the other hand, in the case where the determination result of step S201A is YES, it is determined in step S202A which the energy saving mode is optimum, based on the latest information A. It is noted that the state where the determination result of step S201A is YES means that in the latest information A, the energy saving mode having the usage period of time of the MFP 1 in the time zone the time to change the energy saving mode belongs to equal to or more than the predetermined percentage of the predetermined unit period time exists, as mentioned above. Therefore, in step S202A, this energy saving mode is determined as optimum. That is, in the above-mentioned example, i.e., in the case where the usage period of time of the MFP 1 in the energy saving mode 4 is 100 minutes in the time zone of 22 o'clock through 24 o'clock in the latest information A, the energy saving mode 4 is determined as optimum. Next, in step S203A, the same as in step S203, the MFP 1 is caused to enter the energy saving mode determined as optimum in step S202A.

Thus, according to the procedure of FIG. 7B in the first variant embodiment of the energy saving mode changing process of FIG. 7A, when the energy saving mode is to be changed, in a case where an energy saving mode having the usage period of time of the MFP 1 in the time zone the time to change the energy saving mode belongs to equal to or more than the predetermined percentage of the predetermined unit period time exists in the latest information A, the MFP 1 is caused to enter this energy saving mode, regardless of the information B. Therefore, for example, in a case where the latest usage state of the MFP 1 is such that the MFP 1 is used in a specific energy saving mode much more than the other energy saving modes because of some circumstances, the optimum energy saving mode is determined not based on the usage state of the MFP 1 counted before, but based on the latest usage state.

For example, a case will be assumed where the latest usage state of the MFP 1 is, different from the usage state counted before, such that the facsimile reception printing function has been used frequently. In such a case, when the optimum energy saving mode is determined based on the information B, rather the usage state counted before may be reflected on the determination. In this case, the above-mentioned latest state where the facsimile reception printing function is frequently used may not be positively reflected on the determination.

In contrast thereto, according to the procedure of FIG. 7B, when the energy saving mode is to be changed, in a case where an energy saving mode having the usage period of time of the MFP 1 in the time zone the time to change the energy saving mode belongs to equal to or more than the predetermined percentage of the predetermined unit period time exists in the latest information A, the MFP 1 is caused to enter this energy saving mode regardless of the information B. Therefore, in the above-mentioned example, the above-mentioned latest state where the facsimile reception printing function is frequently used may positively be reflected on the current determination for the optimum energy saving mode. That is, for example, in a case where in the usage state before, the facsimile reception printing function was not so frequently used, the corresponding energy saving mode 4 (see FIG. 5) would not be determined optimum if the determination were made based on the information B. However, according to the procedure of FIG. 7B, in the case where recently the facsimile reception printing function has been frequently used as mentioned above, the energy saving mode 4 may be determined as optimum based on the latest information A regardless of the information B, and thus, the MFP 1 is caused to enter the energy saving mode 4. This is because according to the procedure of FIG. 7B, when the usage period of time of the MFP 1 in the energy saving mode 4 in the time zone the current time belongs to in the latest information A (i.e., the corresponding time zone on the preceding day) is equal to or more than the predetermined percentage of the predetermined unit period of time, the energy saving mode 4 is determined as optimum. As a result, when the facsimile reception printing function is frequently used actually in the current time zone, since the MFP 1 has entered the corresponding energy saving mode 4 at the beginning of the time zone as mentioned above, the energy saving mode 4 can be left unchanged, and thus it is possible to avoid a situation where power consumption increases along with a change of the energy saving mode.

Figure 8A:
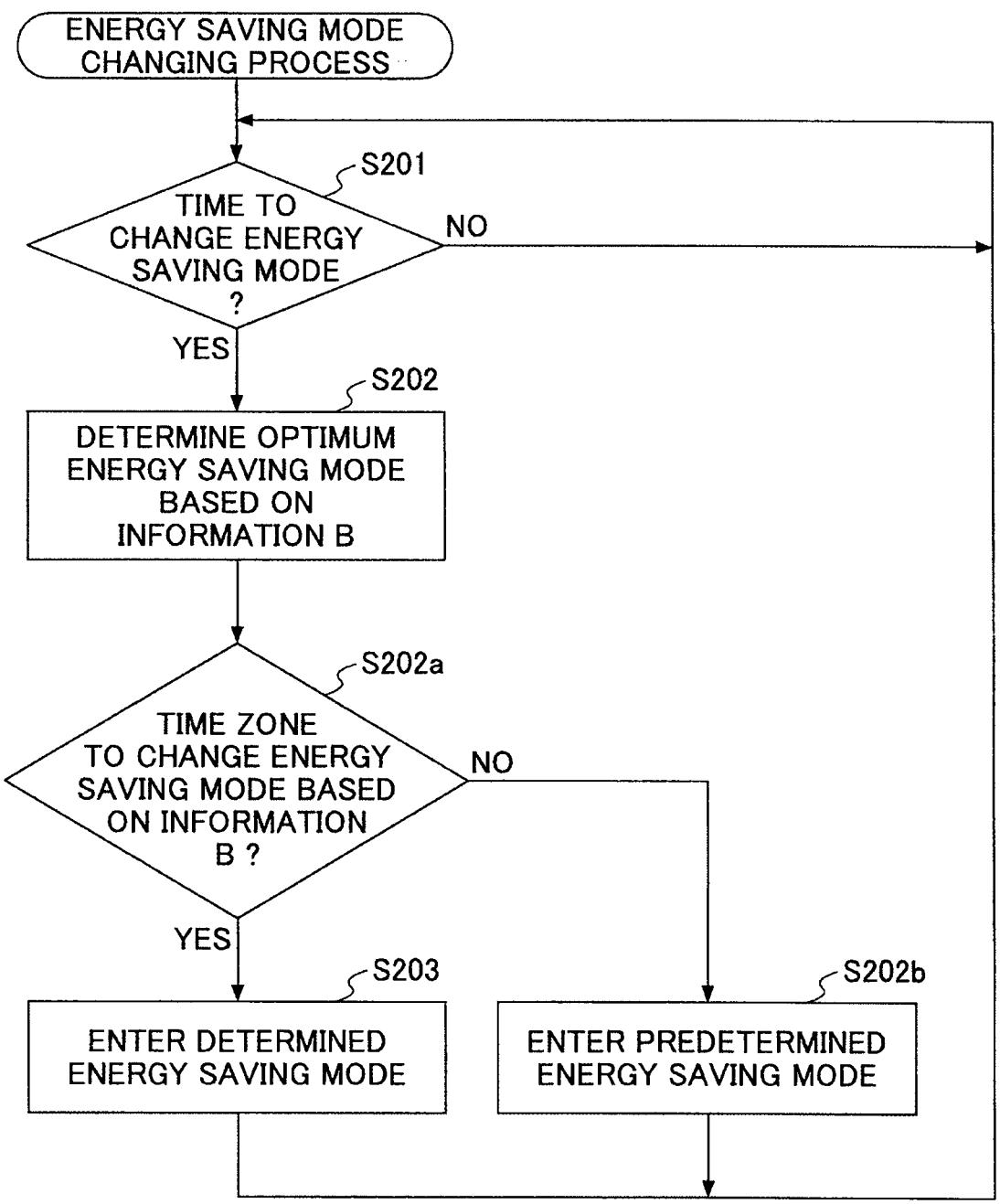
FIG. 8A is a flowchart showing a procedure of a second variant embodiment of the energy saving mode changing process of FIG. 7A.

Further, the energy saving mode changing process described above with reference to FIG. 7A may be varied as follows:

FIG. 8A is a flowchart showing a procedure of a second variant embodiment of the energy saving mode changing process of FIG. 7A. As shown in FIG. 8A, according to the present variant embodiment, in prior to the step of changing the energy saving mode (i.e., step S203) of the procedure of FIG. 7A, a step (i.e., step S203a) of determining whether the time zone the current time belongs to is a time zone of changing the energy saving mode based on the information B. It is noted that in FIG. 8A, the same step number is given to the step identical to the step of FIG. 7A, and a duplicate description will be omitted as is appropriate.

In the procedure of FIG. 8A, the user can previously set to the MFP 1 a time zone in a day for which an operation of automatically determining the optimum energy saving mode based on the information B is not allowed. In step S202a, it is determined whether the time zone the current time belongs to is the time zone for which an operation of automatically determining the optimum energy saving mode based on the information B is not allowed by the user.

In a case where the time zone the current time belongs to is not the time zone for which an operation of automatically determining the optimum energy saving mode based on the information B is not allowed (step S202a YES), the MFP 1 is caused to enter the energy saving mode determined optimum in step S202 (step S203).

On the other hand, in a case where the time zone the current time belongs to is the time zone for which an operation of automatically determining the optimum energy saving mode based on the information B is not allowed (step S202a NO), the MFP 1 is caused to enter a predetermined energy saving mode (for example, the energy saving mode 1 of FIG. 5) (step S202b). It is noted that the predetermined energy saving mode is not limited to the energy saving mode 1, and the user can set any energy saving mode as the predetermined energy saving mode.

Thus, according to the procedure of FIG. 8A, in a case where the user wants to fix the MFP 1 in the predetermined energy saving mode for a specific time zone in a day, such a setting that meets the user's request is available. For example, in a case where it is expected that for a certain time zone, the copy function will be frequently used, it is possible to make a setting such that for this time zone, an operation of automatically determining the optimum energy saving mode based on the information B is not allowed, and the energy saving mode 1 corresponding to the copy function is set as the predetermined energy saving mode.

Figure 8B:
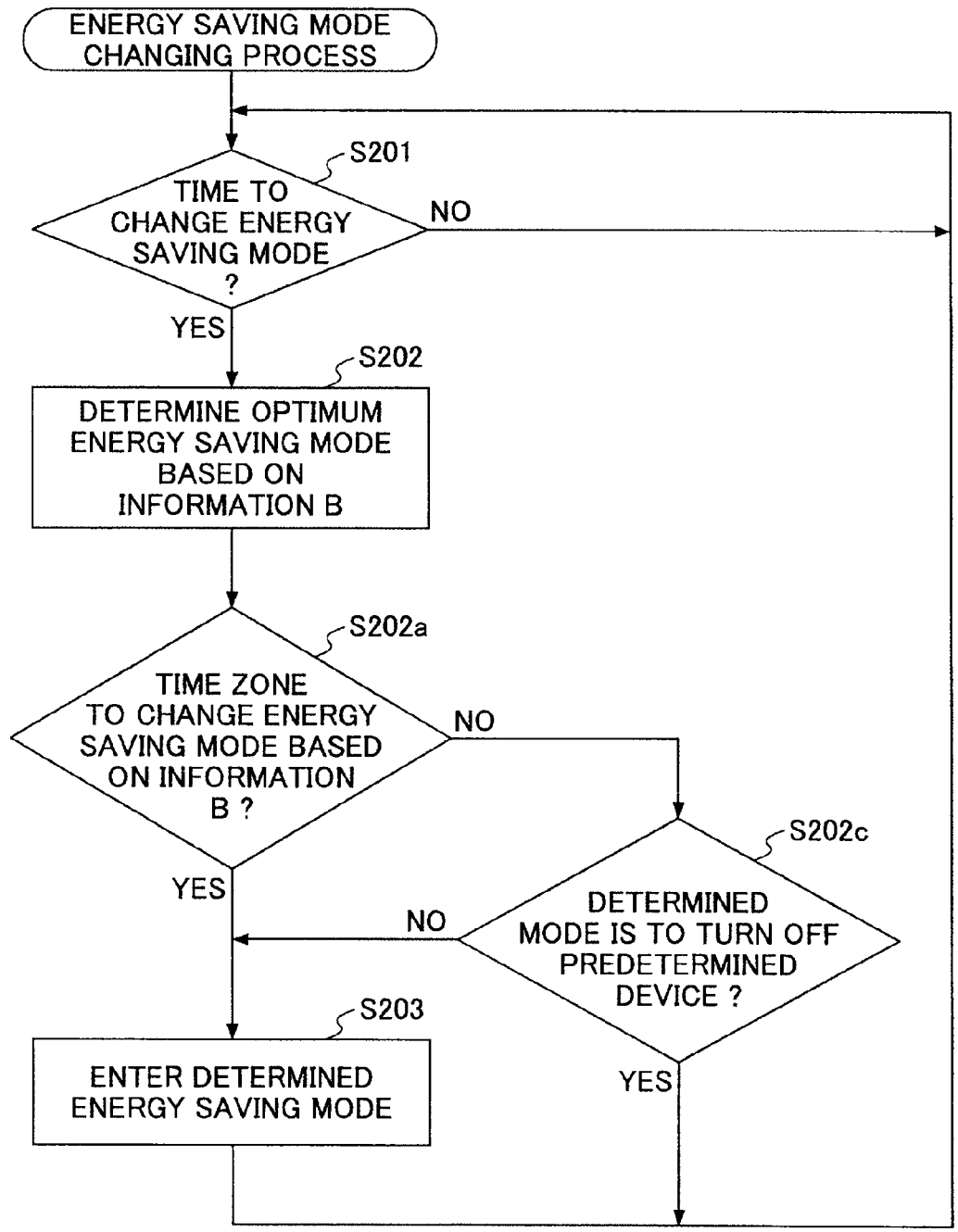
FIG. 8B is a flowchart showing a procedure of a third variant embodiment of the energy saving mode changing process of FIG. 7A.

FIG. 8B is a flowchart showing a procedure of a third variant embodiment of the energy saving mode changing process of FIG. 7A. As shown in FIG. 8B, according to the present variant embodiment, step S202c is provided instead of step S202b of FIG. 8A. It is noted that in FIG. 8B, the same step number is given to the step identical to the step of FIG. 7A or 8A, and a duplicate description will be omitted as is appropriate.

According to the procedure of FIG. 8B, in a case where the time zone the current time belongs to is a time zone for which an operation of automatically determining the optimum energy saving mode (step S203) based on the information B (step S202) is not allowed (step S202a NO), step S202c is carried out. In step S202c, it is determined whether power supplied to a specific device is to be stopped or reduced if the MFP 1 will enter the energy saving mode determined in step S202 in comparison to the current energy saving mode.

In a case where power supplied to the specific device is to be stopped or reduced if the MFP 1 will enter the energy saving mode determined in step S202 in comparison to the current energy saving mode of the MFP 1 (step S202c YES), the current energy saving mode to which the MFP 1 has entered at the beginning of the preceding time zone is maintained for the current time zone. On the other hand, in a case where power supplied to the specific device is neither to be stopped nor to be reduced if the MFP 1 will enter the energy saving mode determined in step S202 in comparison to the current energy saving mode of the MFP 1 (step S202c NO), the MFP 1 is caused to enter the energy saving mode currently determined as optimum in step S202 (step S203).

In order to show a specific example for further specifically illustrating the procedure of FIG. 8B, it is assumed that the energy saving mode to which the MFP 1 has changed at the beginning of the preceding time zone is the energy saving mode 1, the energy saving mode currently determined in step S202 as optimum based on the information B is the energy saving mode 2, and the image forming part 112 has been set as the specific device. In this example, when the MFP 1 enters the energy saving mode 2 from the energy saving mode 1 according to the current determination of step S202, power supplied to the specific device, i.e., the image forming part 112 is stopped or reduced according to FIG. 5. Therefore, in this case, the determination result of step S202c is YES, and thus, the current energy saving mode 1 of the MFP 1 is maintained. On the other hand, another example is assumed where the energy saving mode to which the MFP 1 has entered at the beginning of the preceding time zone is the energy saving mode 2, the energy saving mode currently determined in step S202 as optimum based on the information B is the energy saving mode 1, and the image forming part 112 has been set as the specific device the same as in the above-mentioned example. Then, when the MFP 1 enters the energy saving mode 1 from the energy saving mode 2 according to the current determination of step S202, power supplied to the specific device, i.e., the image forming part 112 is started according to FIG. 5. Therefore, in this case, the determination result of step S202c is NO, and thus, the MFP 1 is caused to enter (step S203) the energy saving mode 1 currently determined as optimum (step S202).

Thus, according to the procedure of FIG. 8B, in a case where the user wants to maintain power supplied to a specific device of the MFP 1 for a specific time zone in a day, such a setting that meets the user's request is available. For example, in a case where for a specific time zone, frequent usage of the copy function is expected, the user may make a setting such that for the specific time zone, an operation of automatically determining the optimum energy saving mode based on the information B is not allowed, and set the image forming part 112, used upon carrying out the copy function, as the specific device.

It is noted that the above-mentioned specific device is not limited to the above-mentioned image forming part 112. Depending on an individual situation, any device, such as a device that consumes the largest power, a device that requires the longest time period for being started up, or such, may be set as the specific device.

Further, the energy saving mode changing process of FIG. 7A may be varied as follows.

Figure 9:
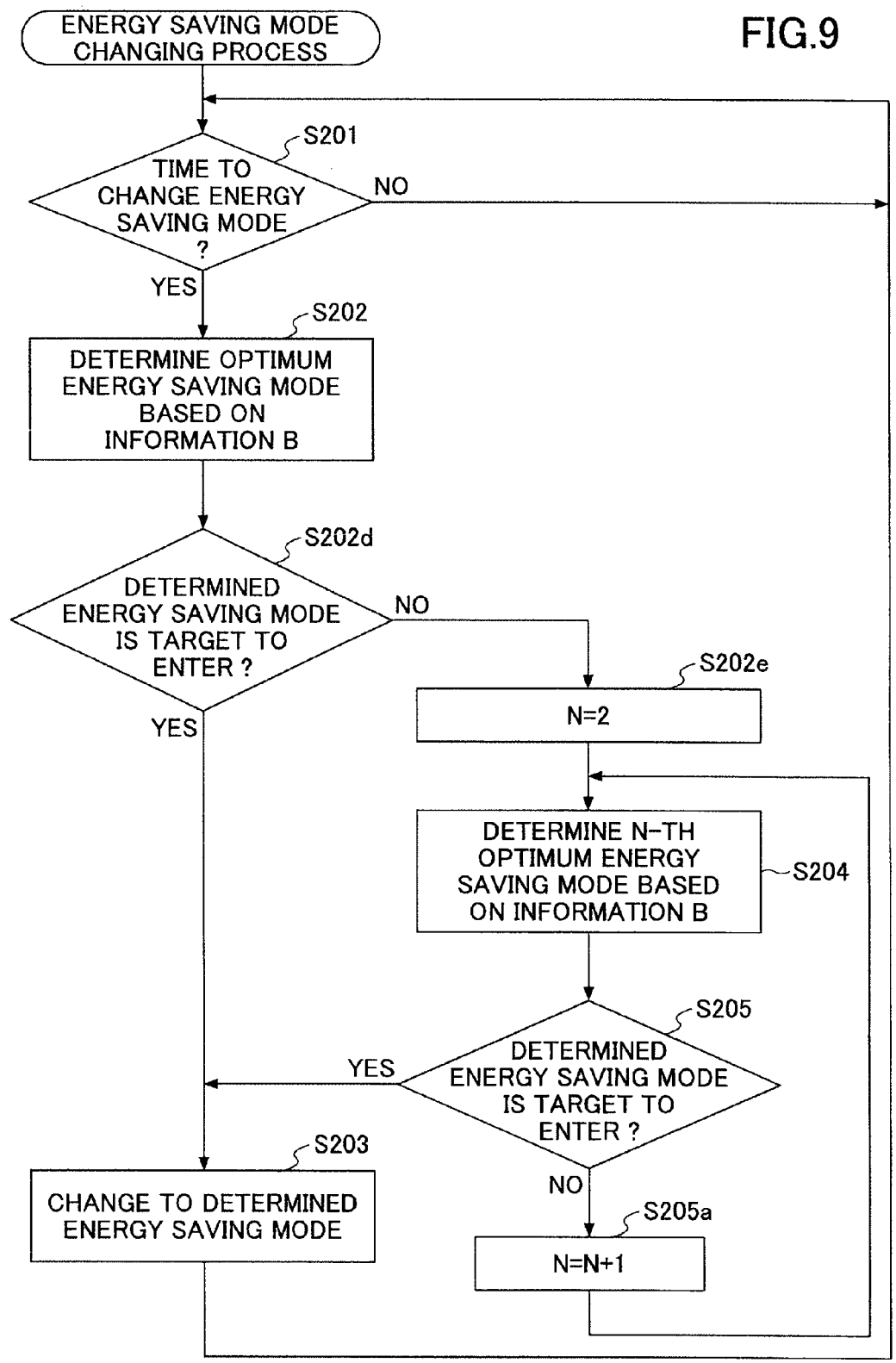
FIG. 9 is a flowchart showing a procedure of a fourth variant embodiment of the energy saving mode changing process of FIG. 7A.

FIG. 9 is a flowchart showing a procedure of a fourth variant embodiment of the energy saving mode changing process of FIG. 7A. As shown in FIG. 9, according to the present variant embodiment, a step of determining whether the energy saving mode determined optimum in step S202 is included in targets to enter (step S202d) is included before the step of changing the energy saving mode (step S203). It is noted that in FIG. 9, the same step number is given to the step identical to the step of FIG. 7A, and a duplicate description will be omitted as is appropriate.

It is noted that "targets to enter" means energy saving modes that are allowed to enter in a certain time zone. That is, according to the procedure of FIG. 9, the user may previously set an energy saving mode to be excluded from the targets to enter for each time zone. Accordingly, in step S202d, it is determined whether the energy saving mode determined as optimum in step S202 is the energy saving mode that has been excluded from the targets to enter for the time zone the current time belongs to.

In a case where the energy saving mode determined as optimum in step S202 is included in the targets to enter (i.e., is not the energy saving mode having been excluded from the targets to enter) (step S202d YES), the MFP 1 is caused to enter the energy saving mode determined as optimum in step S202 (step S203).

On the other hand, in a case where the energy saving mode determined as optimum in step S202 is not included in the targets to enter (i.e., is the energy saving mode having been excluded from the targets to enter) (step S202d NO), a number "N" (described later) is initialized to "2" (step S202e), and step S204 is carried out. In step S204, based on the information B, the energy saving mode that is the next optimum energy saving mode is determined. That is, from the information B in the time zone the current time belongs to, the energy saving mode having the N-th largest sum of the usage periods of time of the MFP 1 is obtained. It is noted that N has been initialized to "2" in step S202e as mentioned above, and thus in this case, from the information B in the time zone the current time belongs to, the energy saving mode having the second largest sum of the usage periods of time of the MFP 1 is obtained.

Next, in a case where the energy saving mode determined as the next optimum energy saving mode in step S204 is included in the targets to enter (i.e., is not the energy saving mode having been excluded from the targets to enter) (step S205 YES), the MFP 1 is caused to enter the energy saving mode determined as the next optimum energy saving mode in step S204 (step S203).

On the other hand, in a case where the energy saving mode determined as the next optimum energy saving mode in step S204 is not included in the targets to enter (i.e., is the energy saving mode having been excluded from the targets to enter) (step S205 NO), "1" is added to N (step S205a), and step S204 is returned to. Thereafter, until the determination result of step S205a becomes YES, the loop process of steps S204, S205 and S205a is repeated.

Thus, according to the procedure of FIG. 9, the MFP 1 is caused to enter the energy saving mode determined as optimum based on the information B after excluding the energy saving mode, previously set by the user to prevent from being entered (i.e., to exclude from the targets to enter) for each time zone. Therefore, it is possible to carry out a flexible setting depending on an individual situation. For example, when the user does not want to cause the MFP 1 to enter the energy saving modes (i.e., the energy saving modes 2, 5, 6, 7 and 8) each stopping or reducing power supplied to the image forming part 112 for a specific time zone, the energy saving modes 2, 5, 6, 7 and 8 may be set as the energy saving modes to be excluded from the targets to enter for the time zone.

In the above-mentioned embodiments, the predetermined unit period of time (i.e., 2 hours) in which usage periods of time are counted in the information A and the information B (see FIGS. 3 and 4) may not be changed. However, in a variant embodiment of the above-mentioned embodiments, the predetermined unit period of time may be changed by the user.

FIG. 10 shows an example of the information A according to this variant embodiment.

The information A shown in FIG. 10 is an example for a case where the predetermined unit period of time has been changed into 4 hours in comparison to the information A shown in FIG. 3 in which the predetermined unit period of time is 2 hours as mentioned above. In this case, also, the information B is such that usage periods of time are added up in every four hours in comparison to the information B of FIG. 4 in which usage periods of time are added up in every two hours as mentioned above. Further, in this case, the times to change the energy saving mode in the flowchart of FIG. 7A, or such, are changed to the starting times (i.e., 0 o'clock, 4 o'clock, . . . ) of the respective predetermined unit periods of time mentioned above (i.e., every four hours) accordingly.

Further, in the above-mentioned embodiments, the information A is information for a day unit. Thus, a counting unit period of time of the information A is a day (i.e., 0:00 through 24:00, as shown in FIGS. 3 and 4). Thus, in the above-mentioned embodiments, the information A is initialized once a day as mentioned above. However, in a variant embodiment of the above-mentioned embodiments, the counting unit period of time may be changed to any unit period of time.

FIG. 11 shows an example of the information A in this variant embodiment. The information A shown in FIG. 11 is information for a week unit.

The information A shown in FIG. 11 is an example for a case where the counting unit period of time has been changed into a week in comparison to the information A shown in FIG. 3 in which the counting unit period of time is a day as mentioned above. In this case, also, the information B is such that usage periods of time are added up for a week unit in comparison to the information B of FIG. 4 in which usage periods of time are added up for a day unit as mentioned above. Thus, in this case, the information B includes sums of usage periods of time recorded for a unit period of a week. Further, in this case, the information A shown in FIG. 11 is used to update the information B every week (for example, every Monday, 0 o'clock), and thereafter, is initialized.

Further, in the above-mentioned embodiments, the information B may also be initialized in a case where a predetermined time period has elapsed, or the user requests to do so.

Next, with reference to FIGS. 12 through 17, yet other variant embodiments will be described in which instead of a usage period of time of the MFP 1 being counted for every energy saving mode, a usage period of time of the MFP 1 is counted for every device the MFP 1 has. It is noted that these variant embodiments have configurations similar to the embodiments described above with reference to FIGS. 1 through 11, and a duplicate description for the identical or corresponding parts as those already described above will be omitted as is appropriate.

In the variant embodiment, as shown in FIG. 12, instead of counting a usage period of time for every energy saving mode in the example of FIG. 3 (i.e., the information A), a usage period of time of the MFP 1 is counted for every device of the MFP 1. The information such as that shown in FIG. 12 thus obtained will be referred to as information D (i.e., fourth information). Similarly, as shown in FIG. 13, instead of the thus-counted usage periods of time of the MFP 1 being added up every energy saving mode in the example of FIG. 4 (i.e., the information B), the thus-counted usage periods of time of the MFP 1 are added up for every device of the MFP 1. The information such as that shown in FIG. 13 thus obtained will be referred to as information E (i.e., fifth information).

FIG. 12 shows an example of the information D.

In FIG. 12, the ordinate axis represents respective devices of the MFP 1, and the abscissa axis represents time zones. In each field of the table of FIG. 12, a usage period of time of the MFP 1 is recorded or updated for every device and for every time zone, as shown in FIG. 12. The information D of FIG. 12 shows, for example, during the time zone of 0 o'clock through 2 o'clock, a function of the MFP 1 using the image input part 111 is used for 10 minutes, and a function of the MFP 1 using the image forming part 112 is used for 5 minutes.

It is noted that the information D is initialized (i.e., all the fields of the table of FIG. 12 are overwritten with the number "0", respectively, as numeric values of the fields) once a day. Further, the information D is an example for a case where the predetermined unit period of time is 2 hours (i.e., a usage period of time of the MFP 1 is counted for every two hours, as shown in FIG. 12).

FIG. 13 shows an example of the information E.

In FIG. 13, the ordinate axis represents respective devices of the MFP 1, and the abscissa axis represents time zones, as in the information D shown in FIG. 12. In each field of the table of FIG. 13, a sum of usage periods of time of the MFP 1 is recorded or updated for every device and for every time zone. The information E of FIG. 13 shows, as a sum for plural days, for example, during the time zone of 0 o'clock through 2 o'clock, a function of the MFP 1 using the image input part 111 being used for a total of 110 minutes, a function of the MFP 1 using the image forming part 112 being used for a total of 20 minutes, and a function of the MFP 1 using the operation and display part 113 being used for a total of 5 minutes.

It is noted that the information E is updated by using the information D (FIG. 12) (i.e., the numeric values of the respective fields of the table of FIG. 12 are added to the numeric values of the corresponding fields of the table of FIG. 13, respectively) once a day. Further, the same as in the information D, the information E is an example for a case where the predetermined unit period of time is 2 hours.

(Process of Counting Usage Periods of Time in Variant Embodiment)

Figure 14:
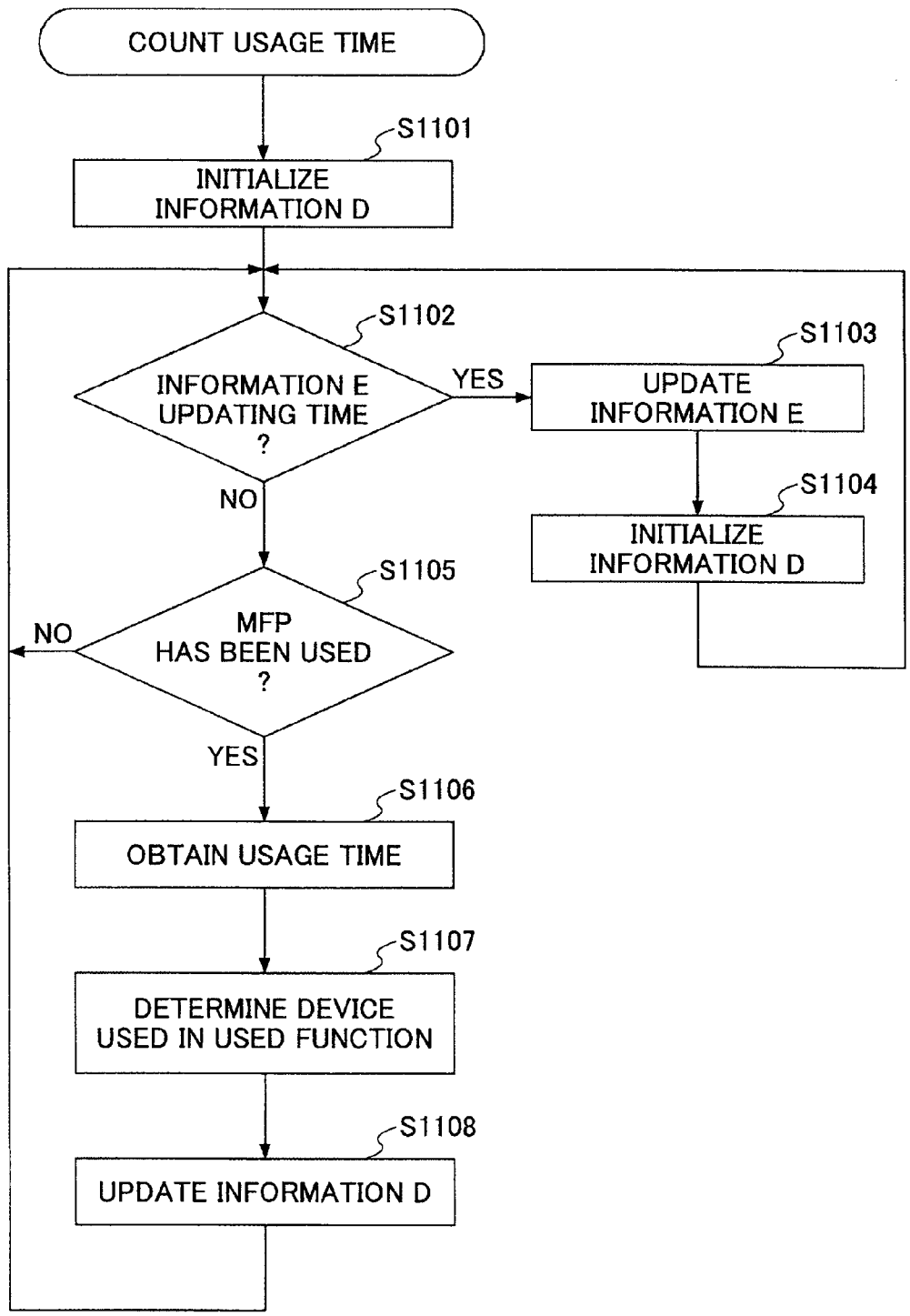
FIG. 14 is a flowchart showing a procedure of a process of counting usage periods of time of the multifunction peripheral for the variant embodiment in which usage periods of time of the multifunction peripheral are counted for every device.

FIG. 14 is a flowchart showing a procedure for obtaining the above-mentioned information D and information E, corresponding to the above-described procedure of FIG. 6 in the embodiment of counting usage periods of time for every energy saving mode, in the variant embodiment of counting usage periods of time of the MFP 1 for every device of the MFP 1.

The same as in the procedure of FIG. 6, the energy saving control part 102 of FIG. 1 carries out each step of the procedure of FIG. 14.

First of the process, the information D is initialized (as mentioned above, all the fields of the table of FIG. 12 are overwritten with number "0", respectively, as the numeric values in the fields) (step S1101).

Next, it is determined whether the current time is the updating time for the information E (step S1102).

In a case where the current time is the updating time for the information E (step S1102 YES), the information D is used to update the information E as mentioned above (step S1103), the information D is then initialized, and step S1102 is returned to (step S1104). Updating the information E is, as mentioned above, carried out by using the information D.

For example, in a case where the current time is the updating time for the information E (for example, 0 o'clock of a day), the numeric values in the respective fields of the information D which indicate counting results of usage periods of time for the past 24 hours are added to the numeric values in the corresponding fields of the information E, respectively. For example, assuming that the information D of FIG. 12 and the information E of FIG. 13 show the current states, respectively, the numeric values in the respective fields of the table of FIG. 12 are added to the numeric values in the corresponding fields of the table of FIG. 13, respectively. For example, according to FIG. 12, during the time zone of "0:00 through 2:00", the usage period of time for which the MFP 1 has been used for the function using the image input part 111 is "10 minutes". Therefore, the value of the "10 minutes" is added to the value "110 minutes" (sum) in the corresponding field of the table of FIG. 13. As a result, "120 minutes" (i.e., 10+110=120) is obtained, and the existing "110 minutes" is overwritten with "120 minutes" in the corresponding field of the table of FIG. 13. Thus, this field of FIG. 13 is rewritten from "110 minutes" into "120 minutes" in this example.

In a case where the current time is not the updating time for the information E (step S1102 NO), it is determined whether the user has used the MFP 1 (step S1105). In a case where the user has used the MFP 1 (step S1105 YES), the usage period of time for which the user has used the MFP 1 is obtained (step S1106). In a case where the user has not used the MFP 1 (step S1105 NO), the process returns to step S1102.

After step S1106 is carried out, the energy saving mode minimum necessary for performing the function that has been used by the user when the user has used the MFP 1 is determined with reference to the information C, and the devices to which power is supplied in the determined energy saving mode are determined (step S1107). That is, for example, when the used function is the copy function, the corresponding energy saving mode is the energy saving mode 1, and the devices to which power is supplied in the determined energy saving mode 1 are the image input part 111, the image forming part 112, the operation and display part 113, . . . , according to the information C of FIG. 5, for example, and thus, these devices are determined in step S1107.

Next, the information D is updated based on the devices determined in step S1107 and the usage period of time obtained in step S1106 (step S1108). Updating the information D means to add the obtained usage period of time to the numeric values in the information D at the respective fields determined by the time zone to which the current time belongs and the determined devices determined in step S1107.

For example, it is assumed that the current time is between 2 o'clock and 4 o'clock (for example, 3 o'clock), FIG. 12 indicates the current state of the information D, the determined devices determined in step S1107 are the image input part 111, the image forming part 112, the operation and display part 113, . . . , and the obtained usage period of time obtained in step S1106 is 5 minutes. In this assumed case, in the information D of FIG. 12, the current value is "20 minutes", "0 minute", "7 minutes", . . . at the respective fields determined by the time zone of 2:00 through 4:00 and the image input part 111, the image forming part 112, the operation and display part 113, . . . (determined devices). Therefore, the same fields are overwritten with "25 minutes", "5 minutes", "12 minutes", . . . , . . . , obtained from adding "5 minutes" (obtained time) to "20 minutes", "0 minute", "7 minutes", . . . , respectively. Thus, the values in the fields are rewritten from "20 minutes", "0 minute", "7 minutes", . . . into "25 minutes", "5 minutes", "12 minutes", . . . , respectively, in this example.

(Energy Saving Mode Changing Process in Variant Embodiment)

Figure 15:
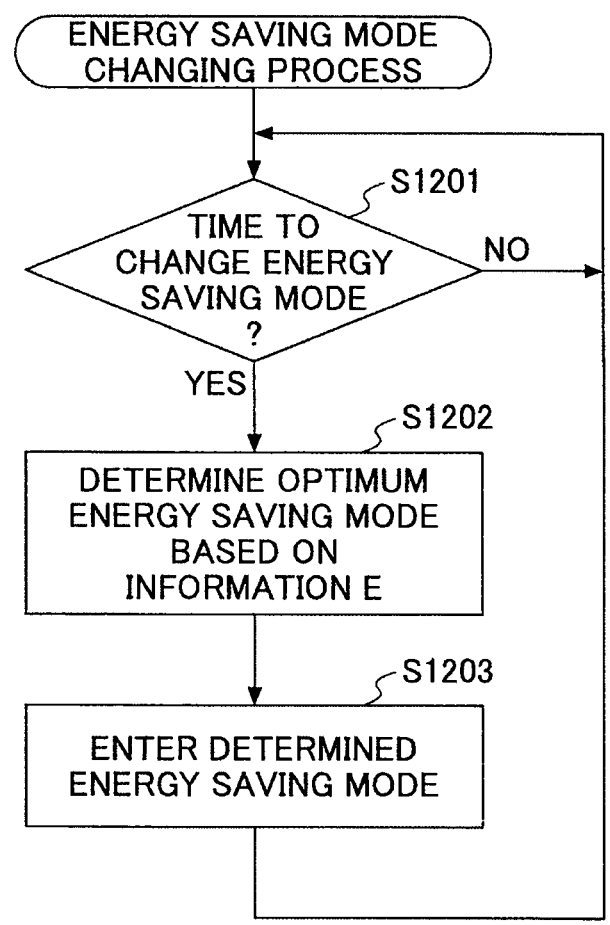
FIG. 15 is a flowchart showing a procedure of an energy saving mode changing process for the variant embodiment in which usage periods of time of the multifunction peripheral are counted for every device and indicating a process of changing the energy saving mode by using the information (information E) of FIG. 13.

FIG. 15 is a flowchart showing a procedure of the energy saving mode changing process using the information E, corresponding to the procedure of FIG. 7A of the embodiment counting usage periods of time of the MFP 1 for every energy saving mode, in the variant embodiment of counting usage periods of time of the MFP 1 for every device the MFP 1 has.

The same as in the procedure of FIG. 7A, the energy saving control part 102 of FIG. 1 carries out each step of the procedure of FIG. 15.

The energy saving mode changing process is automatically started when a time to change the energy saving mode has come (step S1201 YES).

When the time to change the energy saving mode has come (step S1201 YES), it is determined, based on the information E, which one of the energy saving modes is the optimum energy saving mode (step S1202). This determination is carried out as follows. From the information E at the time zone to which the current time belongs, the devices each having the sum of usage periods of time equal to or more than a predetermined value (i.e., a threshold) are determined, and the determined devices are compared with the devices to which power is supplied in each energy saving mode in the information C of FIG. 5, for example. Then, the energy saving mode having the largest number of devices to supply power which respectively agree with those of the devices determined from the information E determined as mentioned above is determined as the optimum energy saving mode for the time zone the current time belongs to. In other words, the energy saving mode having the largest number of devices which respectively agree with one another between the devices to supply power in the energy saving mode and the devices determined from the information E determined as mentioned above is determined as the optimum energy saving mode for the time zone to which the current time belongs. It is noted that the above-mentioned energy saving mode having the largest number of the devices respectively agreeing with the devices determined from the information E, or respectively agreeing with one another, between the devices to supply power in the energy saving mode and the devices determined from the information E determined as mentioned above, may be referred to as the energy saving mode having the highest correspondence, hereinafter.

Next, the MFP 1 is caused to enter the energy saving mode determined optimum in step S1202 (step S1203).

For the purpose of illustrating, a case will be assumed where the current time is 2 o'clock, and the devices each having the sum of usage periods of time recorded equal to or more than the predetermined value in the information E at the fields of the time zone in which 2 o'clock is the stating time (i.e., the fields of the time zone of 2 o'clock through 4 o'clock) are, for example, the image input part 111, the operation and display part 113, the HDD 115, the facsimile control part 114 and the control part 101 (total five). In this case, the number of devices to which power is supplied in each energy saving mode included in the information C of FIG. 5, for example, are compared with the above-mentioned devices determined from the information E, i.e., the image input part 111, the operation and display part 113, the HDD 115, the facsimile control part 114 and the control part 101 (total 5 devices), in step S1202. As a result of the comparison, it is determined as follows, for example, according to FIG. 5. That is, the energy saving mode 1 has a total of 4 devices, i.e., the image input part 111, the operation and display part 113, the HDD 115 and the control part 101, which respectively agree with some (i.e., 4) of the above-mentioned 5 devices determined from the information E. The energy saving mode 2 has the total 5 devices, i.e., the image input part 111, the operation and display part 113, the HDD 115, the facsimile control part 114 and the control part 101, which respectively agree with all of the 5 devices determined from the information E. The energy saving mode 3 has a total of 2 device, i.e., the HDD 115 and the control part 101, which respectively agree with some (i.e., 2) of the devices determined from the information E. It is noted that in this example, in FIG. 5, the state indicated by the symbol "A" is regarded as power not being supplied. The energy saving mode 4 has a total of 3 devices, i.e., the HDD 115, the facsimile control part 114 and the control part 101, which respectively agree with some (i.e., 3) of the devices determined from the information E. The energy saving mode 5 has a total of 2 devices, i.e., the HDD 115 and the control part 101, which respectively agree with some (i.e., 2) of the devices determined from the information E. The energy saving mode 6 has a total of 3 devices, i.e., the HDD 115, the facsimile control part 114 and the control part 101, which respectively agree with some (i.e., 3) of the devices determined from the information E. The energy saving mode 7 has a total of 1 device, i.e., the control part 101, which agrees with only one of the devices determined from the information E. The energy saving mode 8 has no device which agrees with the devices determined from the information E. As a result, the energy saving mode having the highest correspondence is the energy saving mode 2 having the total of 5 devices, respectively agreeing with all of the devices determined from the information E. Thus, the energy saving mode 2 is determined as optimum (step S1202).

As a result, in this example, the MFP 1 is caused to enter the energy saving mode 2 thus determined optimum in step S1202 (step S1203). Thus, in this example, according to the information C of FIG. 5, power is then supplied to the image input part 111, the operation and display part 113, the HDD 115, the facsimile control part 114 and the control part 101, for which power is to be supplied in the determined energy saving mode 2, and thus, the MFP 1 enters the energy saving mode 2.

Thus, according to the procedures of FIGS. 14 and 15, for each time zone of a day, the MFP 1 determines as optimum the energy saving mode having the highest correspondence (of the devices to supply power in comparison with the devices each having the sum of usage periods of time in the time zone equal to or more than the predetermined value), and enters the thus-determined energy saving mode. It is noted that the devices each having the sum of usage periods of time in the time zone equal to or more than the predetermined value can be considered as those having been used for a certain degree of a percentage in the time zone. Therefore, by thus automatically causing the MFP 1 to enter the energy saving mode having the highest correspondence of the devices to supply power in comparison with the devices that can be thus considered as having been used for a certain degree of a percentage in the time zone, power will be thus supplied to most of the devices having been used for the certain degree of a percentage in the time zone. Therefore, in a case where the function that uses the devices that have been used for the certain degree of a percentage in the time zone is actually used in the same time zone, there will be a low likelihood of devices existing for which power supply is to be newly started at this time for the purpose of carrying out the function. Thus, it is possible to avoid a situation where power consumption of the MFP 1 increases because power supply is newly started to some devices at this time.

It is noted that the predetermined value (i.e., the above-mentioned threshold) of the above-mentioned "devices each having the sum of usage periods of time equal to or more than the predetermined value" may preferably be increased, rather than being fixed, along with an increase of each sum included in the information E occurring as time goes on, in consideration that the information E is repeatedly updated as a result of the corresponding counted usage period of time in the information D being added once a day. For example, in the information E of FIG. 13, the sums of the usage periods of time of the respective devices in the time zone the current time belongs to may be averaged for all the devices in the time zone, and a predetermined percentage (for example, 50%) of the thus-obtained average may be determined as the above-mentioned "predetermined value" (threshold). For example, in the example of FIG. 13, the sums of usage periods of time of the respective devices in the time zone of 2 o'clock through 4 o'clock are 20 minutes, 0 minutes, 7 minutes, . . . . Then, assuming that the average thereof is 10 minutes, for example, the predetermined percentage thereof, for example, 50% thereof, i.e., 10 [minutes]×0.5=5 [minutes], may be used as the above-mentioned "predetermined value" (threshold). In the case where thus, 5 minutes, for example, is the predetermined value, the image input part, the operation and display part, . . . , having the sums of usage periods of time, i.e., 20 minutes, 7 minutes, . . . , respectively, equal to or more than the 5 minutes, are determined in step S1202 of FIG. 15 to be used in the subsequently carried out comparison, in the example of FIG. 13.

Figure 16A:
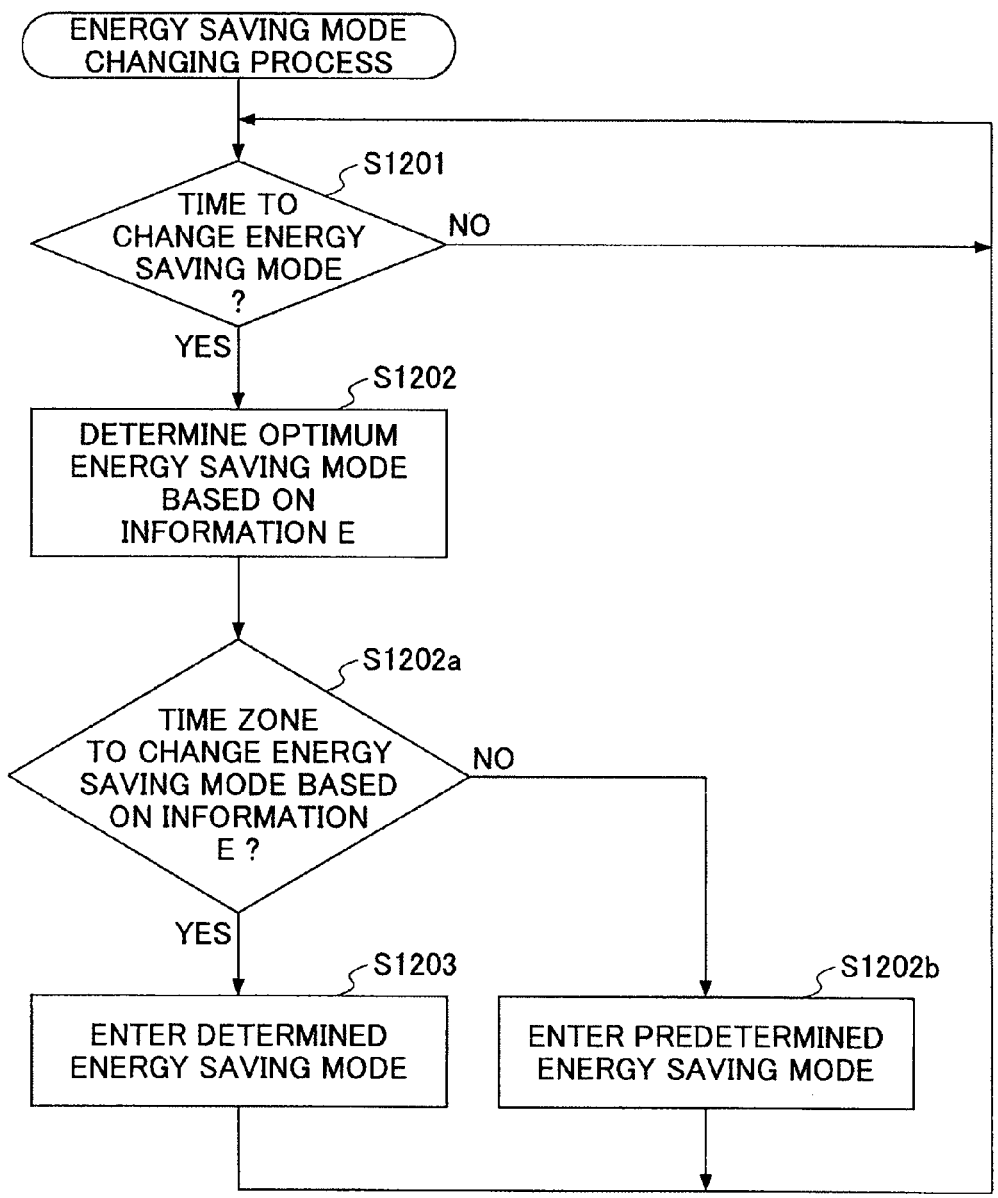
FIG. 16A is a flowchart showing a procedure of a first variant embodiment of the energy saving mode changing process of FIG. 15.

The energy saving mode changing process shown in FIG. 15 may be varied as follows:

FIG. 16A shows a procedure of a first variant embodiment of the energy saving mode changing process of FIG. 15. As shown in FIG. 16A, according to the present variant embodiment, prior to the step of changing the energy saving mode (i.e., step S1203) in the procedure of FIG. 15, a step (i.e., step S1202a) is provided of determining whether the time zone the current time belongs to is a time zone of changing the energy saving mode based on the information E. It is noted that in FIG. 16A, the same step number is given to the step identical to the step of FIG. 15, and a duplicate description will be omitted as is appropriate.

In the procedure of FIG. 16A, the user can previously set to the MFP 1 a time zone in a day for which an operation of automatically determining the optimum energy saving mode based on the information E (step S1202) is not allowed. In step S1202a, it is determined whether the time zone the current time belongs to is the time zone for which thus an operation of automatically determining the optimum energy saving mode based on the information E (step S1202) is not allowed by the user.

In a case where the time zone the current time belongs to is not the time zone for which an operation of automatically determining the optimum energy saving mode based on the information E is not allowed (step S1202a YES), the MFP 1 is caused to enter the energy saving mode determined in step S1202 (step S1203).

On the other hand, in a case where the time zone the current time belongs to is the time zone for which an operation of automatically determining the optimum energy saving mode based on the information E is not allowed (step S1202a NO), the MFP 1 is caused to enter a predetermined energy saving mode (for example, the energy saving mode 1 of FIG. 5) (step S1202b).

Thus, according to the procedure of FIG. 16A, in a case where, for example, the user wants to fix the MFP 1 in the predetermined energy saving mode for a specific time zone in a day, a setting that meets the user's request is possible.

Figure 16B:
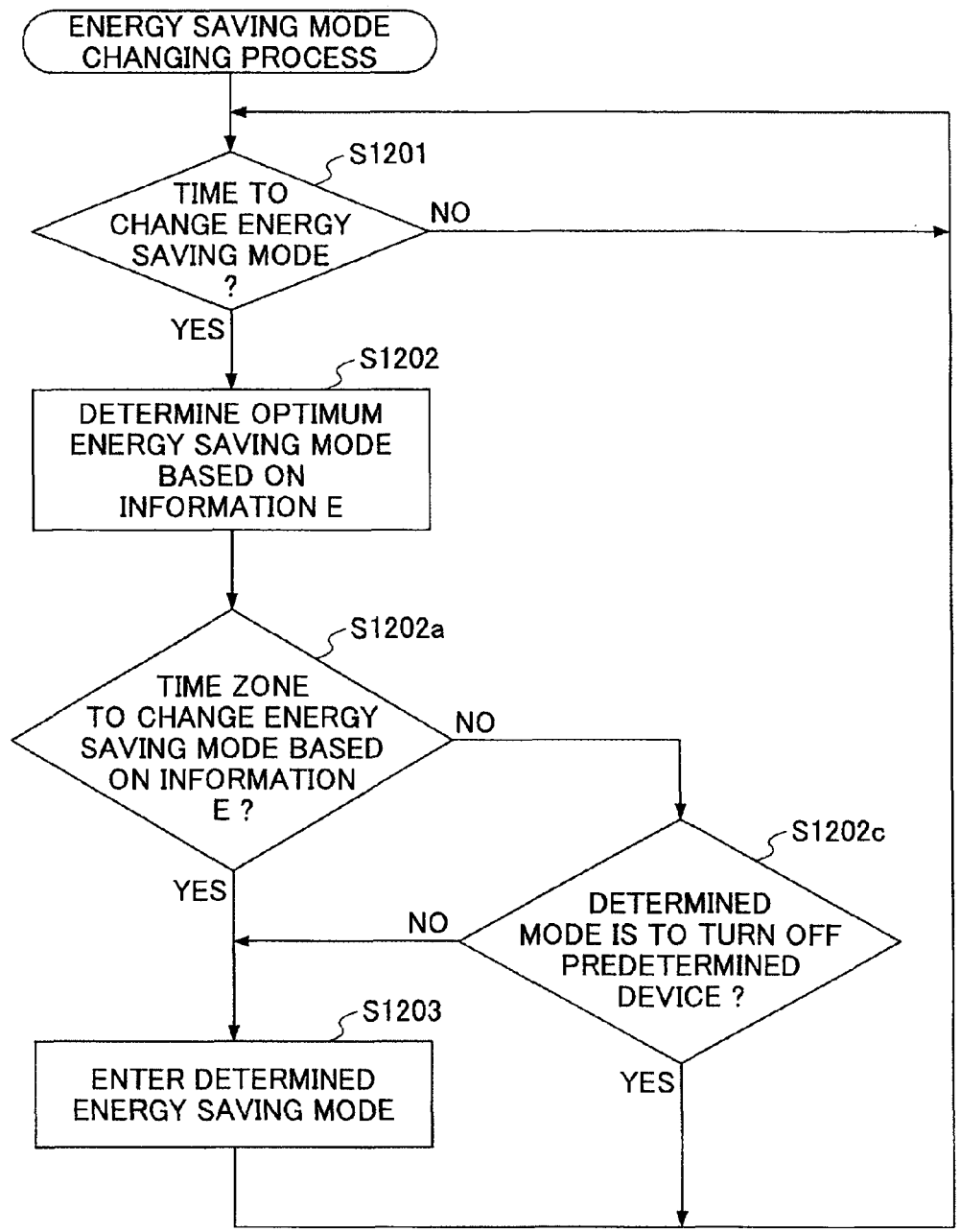
FIG. 16B is a flowchart showing a procedure of a second variant embodiment of the energy saving mode changing process of FIG. 15.

FIG. 16B is a flowchart showing a procedure of a second variant embodiment of the energy saving mode changing process of FIG. 15. As shown in FIG. 16B, according to the present variant embodiment, step S1202c is provided instead of step S1202b of FIG. 16A. It is noted that in FIG. 16B, the same step number is given to the step identical to the step of FIG. 15 or 16A, and a duplicate description will be omitted as is appropriate.

According to the procedure of FIG. 16B, in a case where the time zone the current time belongs to is a time zone for which an operation of automatically determining the optimum energy saving mode based on the information E is not allowed (step S1202a NO), step S1202c is carried out. In step S1202c, it is determined whether power supplied to a specific device is to be stopped or reduced in comparison to the current energy saving mode of the MFP 1, if the MFP 1 enters the energy saving mode determined in step S1202.

In a case where power supply to the specific device is to be stopped or reduced in comparison to the current energy saving mode of the MFP 1, if the MFP 1 enters the energy saving mode determined in step S1202 (step S1202c YES), the energy saving mode to which the MFP 1 has changed at the beginning of the immediately preceding time zone is maintained for the current time zone. On the other hand, in a case where power supply to the specific device is neither to be stopped nor to be reduced in comparison to the current energy saving mode of the MFP 1, if the MFP 1 enters the energy saving mode determined in step S1202 (step S1202c NO), the MFP 1 is caused to enter the energy saving mode currently determined as optimum based on the information E in step S1202 (step S1203).

Thus, according to the procedure of FIG. 16B, in a case where the user wants to maintain power supplied to a specific device of the MFP 1 for a specific time zone in a day, a setting that meets the user's request is possible.

Figure 17:
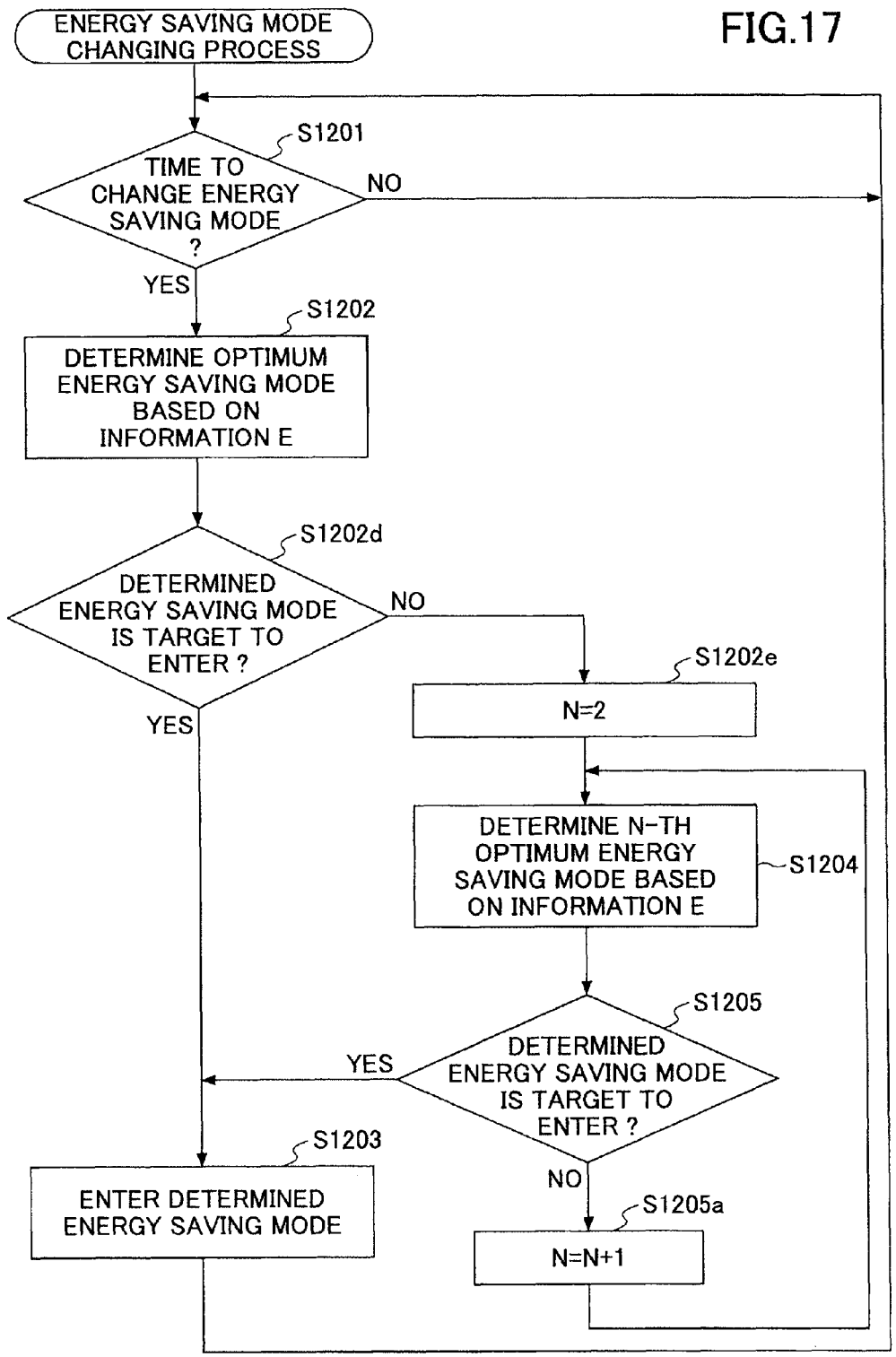
FIG. 17 is a flowchart showing a procedure of a third variant embodiment of the energy saving mode changing process of FIG. 15.

Further, the energy saving mode changing process of FIG. 15 may be varied as follows:

FIG. 17 is a flowchart showing a procedure of a third variant embodiment of the energy saving mode changing process of FIG. 15. As shown in FIG. 17, according to the present variant embodiment, a step of determining whether the energy saving mode determined optimum in step S1202 is included in targets to enter (step S1202d) is provided before the step of changing the energy saving mode (step S1203). It is noted that in FIG. 17, the same step number is given to the step identical to the step of FIG. 15, and a duplicate description will be omitted as is appropriate.

In a case where the energy saving mode determined as optimum in step S1202 is included in the targets to enter (i.e., is not the energy saving mode having been excluded from the targets to enter) (step S1202d YES), the MFP 1 is caused to enter the energy saving mode determined as optimum in step S1202 (step S1203).

On the other hand, in a case where the energy saving mode determined as optimum in step S1202 is not included in the targets to enter (i.e., is the energy saving mode having been excluded from the targets to enter) (step S1202d NO), the variable "N" (described later) is assigned (or initialized to) the number 2 (step S1202e), and step S1204 is carried out. In step S1204, based on the information E, the "next optimum energy saving mode" is determined. That is, the energy saving mode having the N-th highest correspondence (of the devices of supplying power in comparison with the devices each having the sum of usage periods of time equal to or more than the predetermined value) in the time zone the current time belongs to in the information E, is obtained. It is noted that the variable N has been assigned (or initialized to) the number 2 in step S1202e as mentioned above, and thus in this case, in the time zone the current time belongs to in the information E, the energy saving mode having the second highest correspondence (of the devices of supplying power in comparison with the devices each having the sum of usage periods of time equal to or more than the predetermined value) in the time zone the current time belongs to in the information E, is obtained as the above-mentioned "next optimum energy saving mode".

Next, in a case where the energy saving mode determined as the next optimum energy saving mode in step S1204 is included in the targets to enter (i.e., is not the energy saving mode having been excluded from the targets to enter) (step S1205 YES), the MFP 1 is caused to enter the energy saving mode determined as the next optimum energy saving mode in step S1204 (step S1203).

On the other hand, in a case where the energy saving mode determined as the next optimum energy saving mode in step S1204 is not included in the targets to enter (i.e., is the energy saving mode having been excluded from the targets to enter) (step S1205 NO), the variable N is incremented by the number 1 (step S1205a), and the process returns to step S1204. Thereafter, until the determination result of step S1205a becomes YES, the loop process of steps S1204, S1205 and S1205a is repeated.

Thus, according to the procedure of FIG. 17, the MFP 1 is caused to enter the energy saving mode, determined as optimum according to the information E, after exclusion of the energy saving mode that the user previously has set for each time zone to prevent from being entered (i.e., to exclude from the targets to enter). Therefore, it is possible to carry out a flexible setting depending on an individual situation.

Further, for these variant embodiments counting usage periods of time of the MFP 1 for every device the MFP 1 has, the same as in the embodiments counting usage periods of time of the MFP 1 for every energy saving mode, that is, the same as the variant embodiment described above with reference to FIG. 10 for the case of the information A and the information B, the predetermined unit period of time (i.e., 2 hours) in which usage periods of time are counted in the information D and the information E (see FIGS. 12 and 13) may be changed (into 4 hours in the example of FIG. 10) by the user.

Further, also for these variant embodiments counting usage periods of time of the MFP 1 for every device the MFP 1 has, the same as in the embodiments counting usage periods of time of the MFP 1 for every energy saving mode, that is, the same as the variant embodiment described above with reference to FIG. 11 for the case of the information A and the information B, the counting unit period of time may be changed to any unit period of time (for example, a week) in a variant embodiment, instead of the information D being information of a day unit, i.e., the information D being initialized once a day. That is, in the present variant embodiment, the information D may be information of a week unit, the information D may be initialized once a week (in step S1104 of FIG. 14), and along therewith the information E may be updated once a week (in step S1103 of FIG. 14).

Further, also for these variant embodiments of counting usage periods of time of the MFP 1 for every device the MFP 1 has, the same as in the embodiments of counting usage periods of time of the MFP 1 every energy saving mode, the information E may also be initialized in a case where a predetermined time period has elapsed, or the user requests to do so.

The present invention is not limited to the specifically disclosed embodiments, and variations and modifications may be made without departing from the scope of the present invention.

The present application is based on Japanese Priority Patent Applications Nos. 2010-143671 and 2011-88381, filed on Jun. 24, 2010 and Apr. 12, 2011, the entire contents of which are hereby incorporated herein by reference.

What is claimed is:

1. An image processing apparatus, comprising:
an energy saving mode entering process part configured to associate each of plural functions and a minimum necessary energy saving mode of plural energy saving modes to perform the function as first information; and
a counting process part configured to count a usage period of time for a used function of the plural functions for each unit period of time, wherein
the energy saving mode entering process part is configured to determine which of the plural energy saving modes to enter based on the counted usage periods of time for a present unit period of time and cause the image processing apparatus to enter the determined energy saving mode,
the counting process part is configured to determine, when any one of the plural functions is used, based on the first information the energy saving mode associated with the used function, add up the usage period of time for each unit period of time and for each determined energy saving mode, to obtain second information, and add up the second information for each second unit period of time that is longer than the unit period of time, to obtain third information, and
the energy saving mode entering process part is configured to determine which of the plural energy saving modes to enter based on the third information, and cause the image processing apparatus to enter the determined energy saving mode.

2. The image processing apparatus as claimed in claim 1, wherein
the counting process part is configured to initialize the second information every predetermined period of time, and update the third information by using the second information every predetermined period of time.

3. The image processing apparatus as claimed in claim 1, wherein
the energy saving mode entering process part is configured to cause the image processing apparatus to enter an energy saving mode having a usage period of time equal to or more than a predetermined percentage in the present unit period of time of a latest one of the second information instead of an energy saving mode determined based on the third information.

4. The image processing apparatus as claimed in claim 1, wherein
the counting process part is configured to count the usage period of time for the used function for every unit period of time, with the used function being associated with at least one of plural devices; and
the energy saving mode entering process part is configured to compare, based on the counted usage periods of time, the devices each having an associated usage period of time equal to or more than a predetermined value in the present unit period of time with devices each to have power supplied in each energy saving mode, determine the energy saving mode having a largest number of devices to have power supplied which match the devices each having the associated usage period of time equal to or more than the predetermined value in the present unit period of time, and cause the image processing apparatus to enter the determined energy saving mode.

5. The image processing apparatus as claimed in claim 1, wherein
the energy saving mode entering process is configured to read first automatic change data provided for each unit period of time, and avoid automatically causing the image processing apparatus to enter the determined energy saving mode when the first automatic change data indicates not to cause the image forming apparatus to automatically enter any one of the plural energy saving modes for the present unit period of time.

6. The image processing apparatus as claimed in claim 1, wherein
the energy saving mode entering process is configured to read first automatic change data provided for each of the plural energy saving modes, and avoid automatically causing the image processing apparatus to enter the determined energy saving mode when the first automatic change data indicates not to cause the image processing apparatus to automatically enter the determined energy saving mode.

7. An image processing apparatus, comprising:
an energy saving mode entering process part configured to associate each of plural functions and a minimum necessary energy saving mode of plural energy saving modes to perform the function as first information; and
a counting process part configured to count a usage period of time for a used function of the plural functions for each unit period of time, wherein
the energy saving mode entering process part is configured to determine which of the plural energy saving modes to enter based on the counted usage periods of time for a present unit period of time and cause the image processing apparatus to enter the determined energy saving mode,
the counting process part is configured to count the usage period of time for the used function for every unit period of time, with the used function being associated with at least one of plural devices,
the energy saving mode entering process part is configured to compare, based on the counted usage periods of time, the devices each having an associated usage period of time equal to or more than a predetermined value in the present unit period of time with devices each to have power supplied in each energy saving mode, determine the energy saving mode having a largest number of devices to have power supplied which match the devices each having the associated usage period of time equal to or more than the predetermined value in the present unit period of time, and cause the image processing apparatus to enter the determined energy saving mode,
the counting process part is configured to determine the devices the used function uses, add up the associated usage period of time for each of the devices associated with the used function for each unit period of time to obtain second information, and add up the second information for each second unit period of time that is longer than the unit period of time to obtain third information, and
the energy saving mode entering process part is configured to determine which of the plural energy saving modes to enter based on the third information, and causes the image processing apparatus to enter the determined energy saving mode.

8. The image processing apparatus as claimed in claim 7, wherein
the counting process part is configured to initialize the second information every predetermined period of time, and update the third information by using the second information every predetermined period of time.

9. A control method for controlling an image processing apparatus, comprising:
counting a usage period of time for a used function of plural functions for each unit period of time;
determining the energy saving mode associated with the used function, and counting the usage period of time at each unit period of time for each energy saving mode determined; and
determining which of plural energy saving modes to enter based on the counted usage periods of time for a present unit period of time, the determining including determining which of the plural energy saving modes to enter based on the counted energy saving mode having a largest value of the usage period of time at the present unit period of time;
associating each of the plural functions with a minimum necessary energy saving mode of the plural energy saving modes to perform the function as first information; and
entering the determined energy saving mode,
the method further comprising:
determining based on the first information the energy saving mode associated with the used function, adding up the usage period of time for each unit period of time and for each determined energy saving mode to obtain second information; and
adding up the second information for each second unit period of time that is longer than the unit period of time to obtain third information.

10. The control method as claimed in claim 9, further comprising:
initializing the second information every predetermined period of time; and updating the third information by using the second information every predetermined period of time.

11. The control method as claimed in claim 9, further comprising:
entering an energy saving mode having a usage period of time equal to or more than a predetermined percentage in the present unit period of time of a latest one of the second information instead of an energy saving mode determined based on the third information.

12. The control method as claimed in claim 9, further comprising:
counting the usage period of time for the used function uses for every unit period of time, with the used function being associated with at least one of plural devices; and
comparing, based on the counted usage periods of time, the devices each having an associated usage period of time equal to or more than a predetermined value in the present unit period of time with devices each to have power supplied in each energy saving mode; determining the energy saving mode having a largest number of devices each to have power supplied which matches the devices each having the associated usage period of time equal to or more than the predetermined value in the present unit period of time; and entering the determined energy saving mode.

13. The control method as claimed in claim 12, further comprising:
determining the devices the used function uses; adding up the associated usage period of time for each of the devices associated with the used function for each unit period of time to obtain fourth information; and adding up the fourth information for each second unit period of time that is longer than the unit period of time to obtain fifth information.

14. The control method as claimed in claim 13, further comprising:
   initializing the fourth information every predetermined period of time, and updating the fifth information by using the fourth information every predetermined period of time.

15. The control method as claimed in claim 9, further comprising:
   reading first automatic change data provided for each unit period of time; and avoiding automatically entering the determined energy saving mode when the first automatic change data indicates not to automatically enter any one of the plural energy saving modes for the present unit period of time.

16. The control method as claimed in claim 9, further comprising:
   reading first automatic change data provided for each of the plural energy saving modes; and avoiding automatically entering the determined energy saving mode when the first automatic change data indicates not to automatically enter the determined energy saving mode.

* * * * *